United States Patent [19]
Abe et al.

[11] Patent Number: 6,043,962
[45] Date of Patent: Mar. 28, 2000

[54] TAPE CASSETTE AND METAL MOLD DEVICE FOR MOLDING TAPE CASSETTE HALVES

[75] Inventors: Masanori Abe; Kazuo Ozawa, both of Miyagi, Japan

[73] Assignee: Sony Corporation, Japan

[21] Appl. No.: 09/042,043

[22] Filed: Mar. 13, 1998

Related U.S. Application Data

[62] Division of application No. 08/736,606, Oct. 25, 1996, Pat. No. 5,774,312.

[30] Foreign Application Priority Data

| Oct. 31, 1995 | [JP] | Japan | 7-284191 |
| Nov. 28, 1995 | [JP] | Japan | 7-309138 |
| Dec. 14, 1995 | [JP] | Japan | 7-325768 |
| Dec. 15, 1995 | [JP] | Japan | 7-327737 |
| Feb. 29, 1996 | [JP] | Japan | 8-043735 |
| Nov. 15, 1997 | [JP] | Japan | 7-296955 |

[51] Int. Cl.[7] ............................................ G11B 23/087
[52] U.S. Cl. ...................................... 360/132; 264/328.1
[58] Field of Search .................... 360/132; 242/347; 264/328.1, 328.8; 425/556, 577

[56] References Cited

U.S. PATENT DOCUMENTS

| 4,365,711 | 12/1982 | Long | 206/387 |
| 4,674,703 | 6/1987 | Falk | 242/199 |
| 5,084,223 | 1/1992 | Morita et al. | 264/161 |
| 5,186,955 | 2/1993 | Morita et al. | 425/130 |
| 5,201,476 | 4/1993 | Gelardi et al. | 242/199 |
| 5,342,002 | 8/1994 | Morita | 242/347 |
| 5,429,492 | 7/1995 | Taniyama | 425/556 |
| 5,556,651 | 9/1996 | Watanabe et al. | 425/556 |
| 5,561,573 | 10/1996 | Morita et al. | 360/132 |
| 5,730,382 | 3/1998 | Kaneda et al. | 242/347 |
| 5,738,883 | 4/1998 | Tanaka | 425/190 |
| 5,788,906 | 8/1998 | Morita | 264/245 |

*Primary Examiner*—William Klimowicz
*Attorney, Agent, or Firm*—Rader, Fishman & Grauer; Ronald P. Kananen

[57] ABSTRACT

A tape cassette housing a cassette main body unit a pair of tape reels. The cassette main body unit is made up of an upper cassette half and a lower cassette half, and a tape-shaped recording medium is placed between the tape reels. A frame unit is provided of a synthetic resin having an integrally formed design statement detection unit or a loading reference used for loading the tape cassette on a recording and/or reproducing apparatus. The frame unit also has, as an aperture, a portion registering with a tape reel rotation area on its bottom side, and a metallic plate integrated into the aperture for forming a portion of the tape reel rotation area on the bottom of the frame unit. The metallic plate has a pair of reel bearing holes into which is intruded the tape driving unit. The metallic plate is integrated by insertion molding into the aperture of the frame unit. The main body unit of the tape cassette is made up of the frame unit of synthetic resin and the metallic plate for realizing sufficient mechanical strength against warping or distortion and maintaining the overall weight of the tape cassette.

6 Claims, 15 Drawing Sheets

TAPE CASSETTE AND METAL MOLD DEVICE FOR MOLDING TAPE CASSETTE HALVES

This application is a divisional of application Ser. No. 08/736,606 filed Oct. 25, 1996, now U.S. Pat. No. 5,774,312.

BACKGROUND OF THE INVENTION

1. Field of the Invention

This invention relates to a tape cassette and a metal mold device for molding tape cassette halves designed for housing therein a tape-shaped recording medium, such as a magnetic tape. More particularly, it relates to a tape cassette made up of a pair of cassette halves part of which is formed by a metallic plate, and to a metal mold device for molding the cassette halves of the metal mold.

2. Description of the Related Art

Up to now, a tape cassette housing therein a magnetic tape having a tape width of 8 mm has been used for recording data processed by a video tape recorder recording video signals or a computer.

A tape cassette used as a recording medium for a video tape recorder is configured as shown for example in FIG. 1. Such a video tape cassette 100, abbreviated herein to a tape cassette, is comprised of a rectangular main cassette portion 101 made up of a pair of cassette halves, namely an upper cassette half 102 and a lower cassette half 103, as shown in FIGS. 1 and 2. On a front side of a front surface 105 of the main cassette portion 101, via which a magnetic tape 107 is pulled outside, is rotatably mounted a lid member 104. The front surface 105, via which the magnetic tape 107 is pulled out, delimits a spacing for loading 105 into which is intruded a tape loading unit on the video tape recorder on which is loaded the tape cassette 100, as shown in FIG. 3. The spacing for loading 105 is usually closed by the lid member 104.

The tape cassette 100 includes the main cassette portion 101 within which are rotatably mounted a pair of tape reels 106A, 106B about which is placed the magnetic tape 107 having a width of 8 mm.

The magnetic tape 107 is pulled out from a tape reel 106A and guided by a tape guide unit, not shown, along the spacing for loading 105 by a guide mechanism, not shown, so as to be taken up on the opposite side tape reel 106B. The state of winding of the magnetic tape 107 on the tape reel 106 in the tape cassette 100 can be checked from outside via a reel window 108 provided in the upper cassette half 102, as shown in FIG. 1.

The lower cassette half 103 is provided with a pair of reel bearing holes 109A, 109B for causing hubs of the tape reels 106 housed therein to face outwards, as shown in FIG. 3. On the back surface of the lower cassette half 103 is formed a reel lock guide portion 110 intermediate between the reel bearing holes 109A, 109B, while an end detector 111 is provided on the front side of the lower cassette half 103, as shown in FIG. 3. On both corner portions on the back surface of the lower cassette half 103 are provided plural design statement detection portions 112A, 112B constituted by plural detection holes opened at pre-set positions in association with tape design statements, such as type, length or recording density of the magnetic tape 107.

Although not shown in detail, the reel lock guide portion 110 is made up of a reel lock guide groove formed in the lower cassette half 103, a reel lock member movably housed within the reel lock guide groove in the inside of the lower cassette half 103 for movement in the fore-and-aft direction, a pair of reel lock levers mounted integrally with or for rotation in unison with the reel lock member, and a reel lock spring. When the tape cassette is not in use, the reel lock guide portion 110 retains the tape reels 106A, 106B against idle rotation by the foremost part of the reel lock lever meshing with an outer peripheral tooth formed on the pouter periphery of flange portions of the tape reels 106A, 106B.

With the above-described structure of the tape cassette 100, when the cassette main portion 100 is loaded in the video tape recorder, with the bottom surface and both lateral sides of the cassette main portion 101 as reference surfaces, the reel lock member is moved against the elastic force of the reel lock spring by a reel unlocking member intruded from the reel lock guide groove. The tape reels 106A, 106B of the tape cassette 100 are released from the retained state by the reel lock lever and become rotatable.

On the other hand, the lid 104 of the tape cassette 100 is rotated by the lid opening mechanism provided on the video tape recorder for opening the spacing for loading 106. In the above-mentioned unlocked state of the tape reels 106A, 106B, the magnetic tape 107 of the tape cassette 100 is pulled out by the loading unit provided in the video tape recorder intruded via the loading for spacing 105 for defining a pre-set tape running path by way of effecting a loading operation.

A reel driving shaft 120 of the video tape recorder is intruded into reel bearing holes 109A, 109B for being engaged with hub openings formed in the tape reel 106. With reel driving shafts 120A, 120B being run in rotation by the recording or reproducing operation, the tape reels 106A, 106B of the tape cassette 100 are run in rotation for reeling out or taking up the magnetic tape 107. When the tape cassette 100 is loaded on the video tape recorder, the design statement portions 112A, 112B formed on both core portions of the lower cassette half 103 are detected by a detection mechanism, not shown.

In general, the upper cassette half 102a and the lower cassette half 102b of the tape cassette are molded of a synthetic resin material for reducing the weight. Therefore, if the small-sized tape cassette 100 having housed therein the magnetic tape 107 having a tape width of 8 mm is loaded on the video tape recorder for driving the tape, the tape cassette in its entirety is oscillated by the operation of the tape driving mechanism to render the running performance of the magnetic tape 107 instable. Since the recording/reproducing characteristics of the information signals recorded to a high recording density on the magnetic tape 107 are deteriorated by this phenomenon, the tape cassette 100 needs to be constructed to have a constant weight to eliminate adverse effects such as oscillations transmitted from the tape recording mechanism of the video tape recorder.

For overcoming such inconvenience, there is proposed a in JP Utility Model Kokai JP-A-63-38460 a tape cassette in which a cassette main body portion is constructed by securing a pre-molded synthetic resin member by an adhesive to a frame-shaped metallic member exposed to a lower cassette half by reel bearing holes. This tape cassette has such features that the overall mechanical strength is maintained against torsion or warping and that, since a portion of the cassette main body portion is formed of a metallic material, the overall weight is increased and the reel holes are improved in accuracy.

However, with the above tape cassette, since the metallic member and the synthetic resin member are secured to each other by the adhesive, the frame assembling process is complicated and involves a large number of steps, while the adhesive is laborious to handle, thus raising difficulties in production. Moreover, since the reference plane is constructed towards the metallic member, the cassette loading unit, reel unlock member, lid opening mechanism or the detection unit of the video tape recorder tend to be worn out by the loading operations of the tape cassette on the video tape recorder.

Moreover, in order for the tape cassette to be loaded correctly on the video tape recorder, the shape or interval of the reel holes or the above-mentioned various members of the cassette main body portion need to be positioned accurately relative to one another. However, since these positioning members are formed on the metallic frame to form the lower cassette half in the above-described prior-art tape cassette, it is difficult to maintain high precision of the component parts as compared to a tape cassette employing a frame formed of synthetic resin.

For overcoming such inconvenience, a tape cassette has been developed in which the basic structure of a cassette main body portion combined from a metallic member and a synthetic resin member is used, more specifically, an outer portion of the lower cassette half is formed of synthetic resin and a metallic plate is insertion-molded on the bottom plate portion of the lower cassette half. With such tape cassette, since it has a pre-set weight, the magnetic tape is allowed to run in stability without being affected by vibrations of the tape driving mechanism to permit reliable high-density recording and/or reproduction of information signals. Moreover, since the positioning portions or sliding portions of the tape cassette are formed on the synthetic resin member, there is no risk of abrasion of various engagement members of the video tape recorder.

However, with this tape cassette, because of the large differential thermal contraction ratio between the synthetic resin and the metallic plate, the force of contraction at the time of curing of the synthetic resin portion acts on the metallic plate making up a portion of the bottom plate of the lower cassette half, thus severely warping the metallic plate. This phenomenon results in a variety of problems such as incapacitated loading of the tape cassette on the video tape recorder, rotational troubles of the tape reels or inaccurate positioning of various component parts.

This inconvenience may be dealt with by using a metal plate of increased thickness and mechanical strength to prevent deformation due to thermal contraction. However, the outer size of a tape cassette is prescribed by pertinent standards, so that, if a metallic plate producing a desired effect is used, the overall thickness of the tape cassette cannot be comprised within a prescribed value.

SUMMARY OF THE INVENTION

It is therefore an object of the present invention to provide a novel tape cassette capable of overcoming the above problems inherent in a conventional tape cassette.

It is another object of the present invention to provide a tape cassette in which a tape-shaped recording medium can be run in stability against vibrations transmitted from the tape driving mechanism for assuring satisfactory recording/reproducing characteristics.

It is still another object of the present invention to provide a tape cassette in which overall mechanical strength may be maintained while various reference component parts are formed to high precision and there is no risk of abrasion of various engagement members of the recording/reproducing apparatus.

It is still another object of the present invention to provide a tape cassette which can be formed to high precision.

It is still another object of the present invention to provide a metallic mold device for molding cassette halves of a tape cassette whereby cassette halves of the tape cassette having an integral metal plate can be molded with high accuracy.

It is yet another object of the present invention to provide a metal mold device for molding cassette halves of a tape cassette whereby the cassette halves of a tape cassette having an integral metal plate can be molded without molding distortion.

DESCRIPTION OF THE PREFERRED EMBODIMENTS

Figure 1:
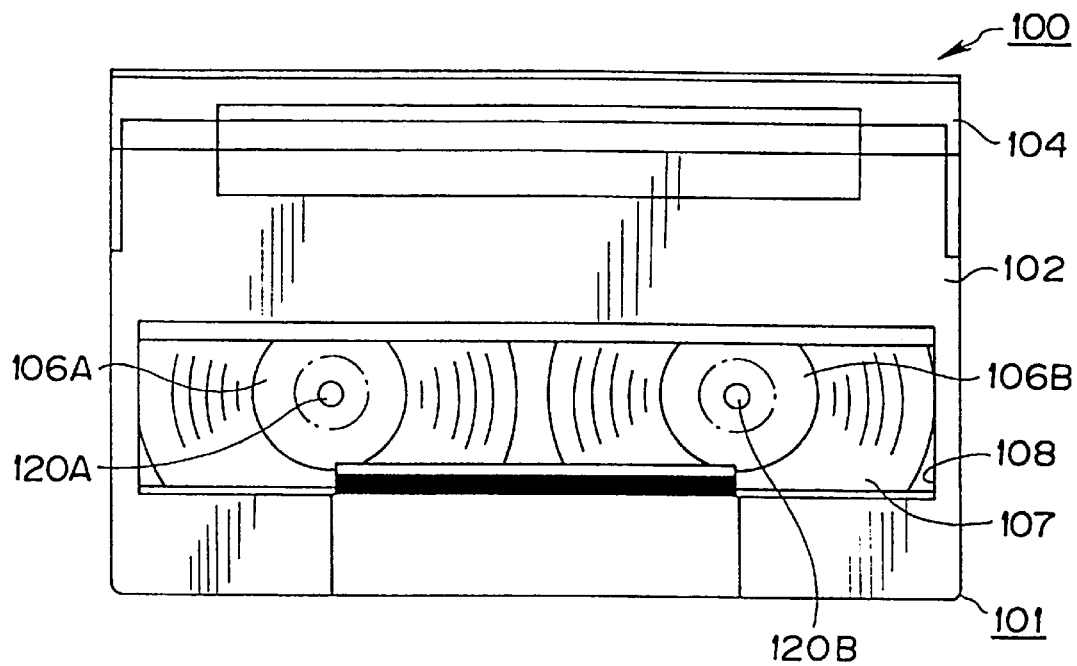
FIG. 1 is a plan view showing a conventional tape cassette housing therein a magnetic tape having a tape width of 8 mm.
Figure 2:
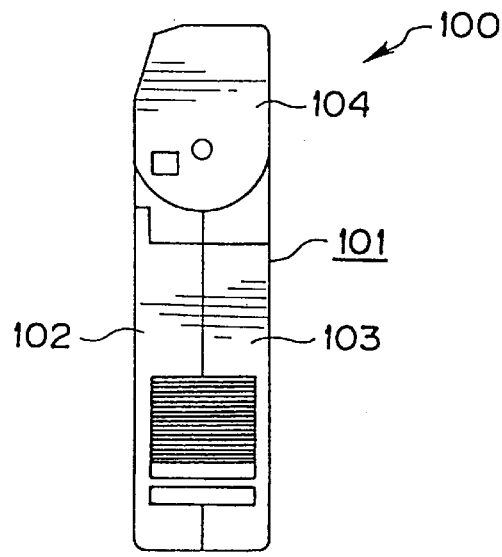
FIG. 2 is a side view of the tape cassette shown in FIG. 1.
Figure 3:
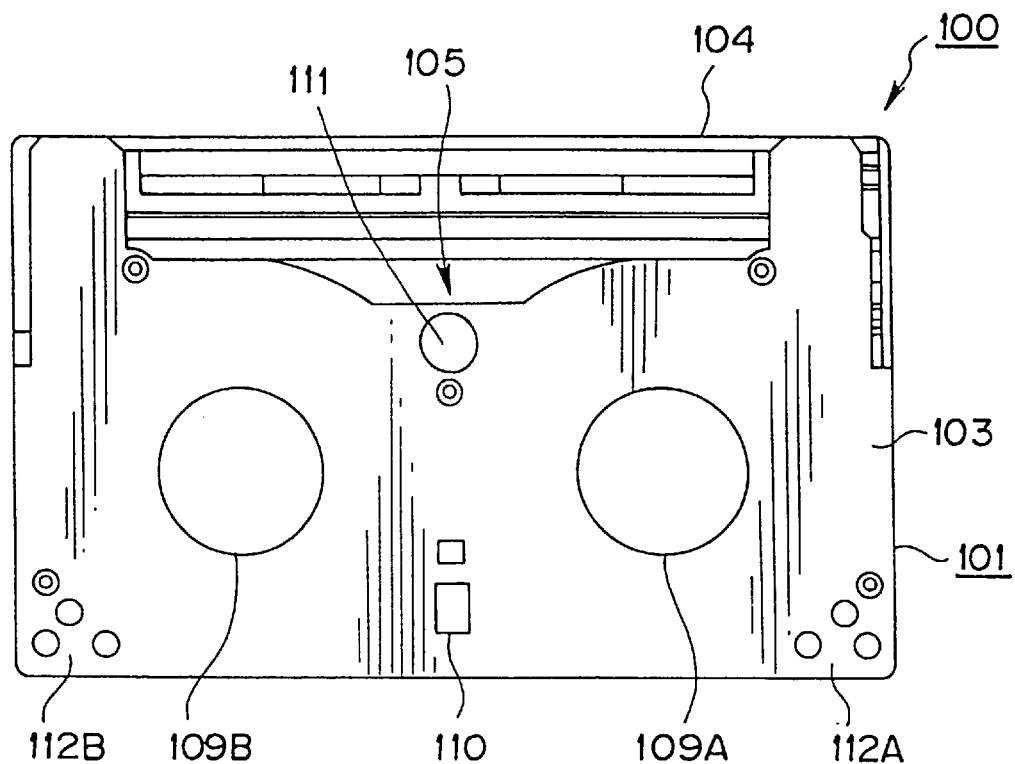
FIG. 3 is a bottom view of the tape cassette shown in FIG. 1.

Referring to the drawings, preferred embodiments of the present invention will be explained in detail.

A tape cassette, now explained, has housed therein a magnetic tape having a tape width of 8 mm.

Figure 4:
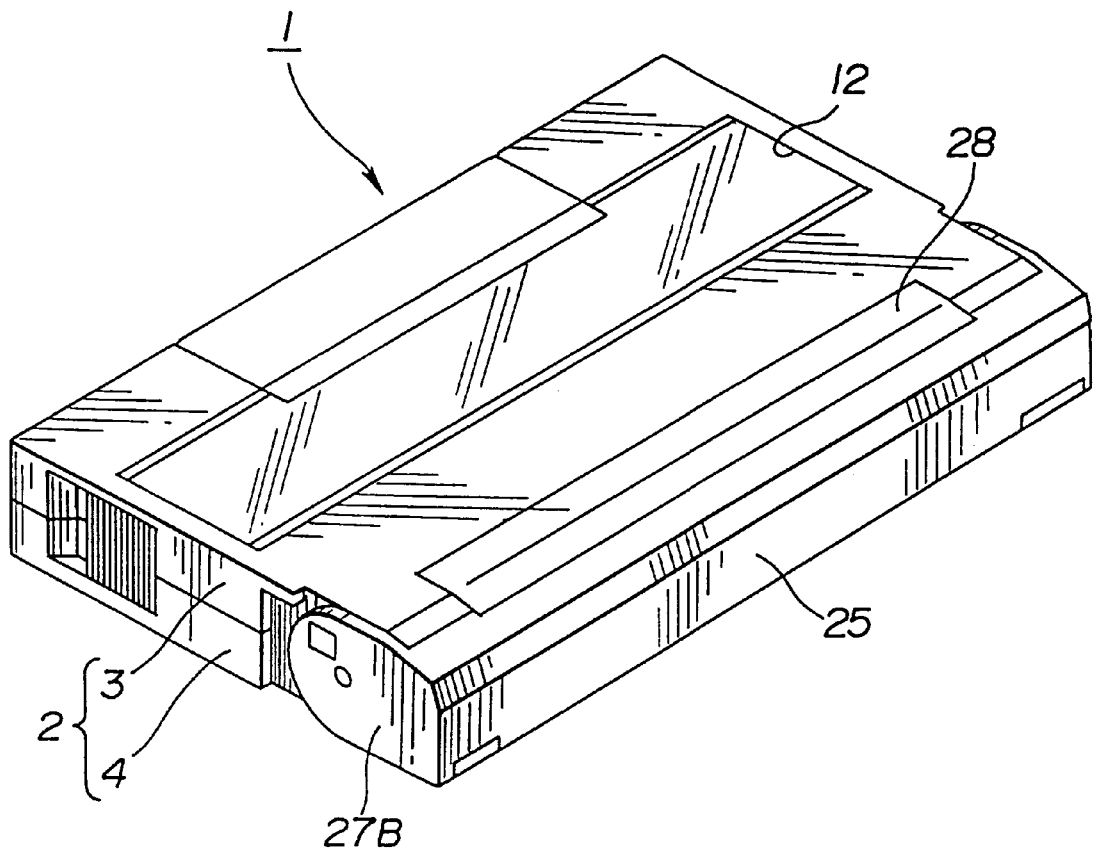
FIG. 4 is a perspective view showing a tape cassette of the present invention, with the tape cassette housing therein a magnetic tape having a tape width of 8 mm.
Figure 5:
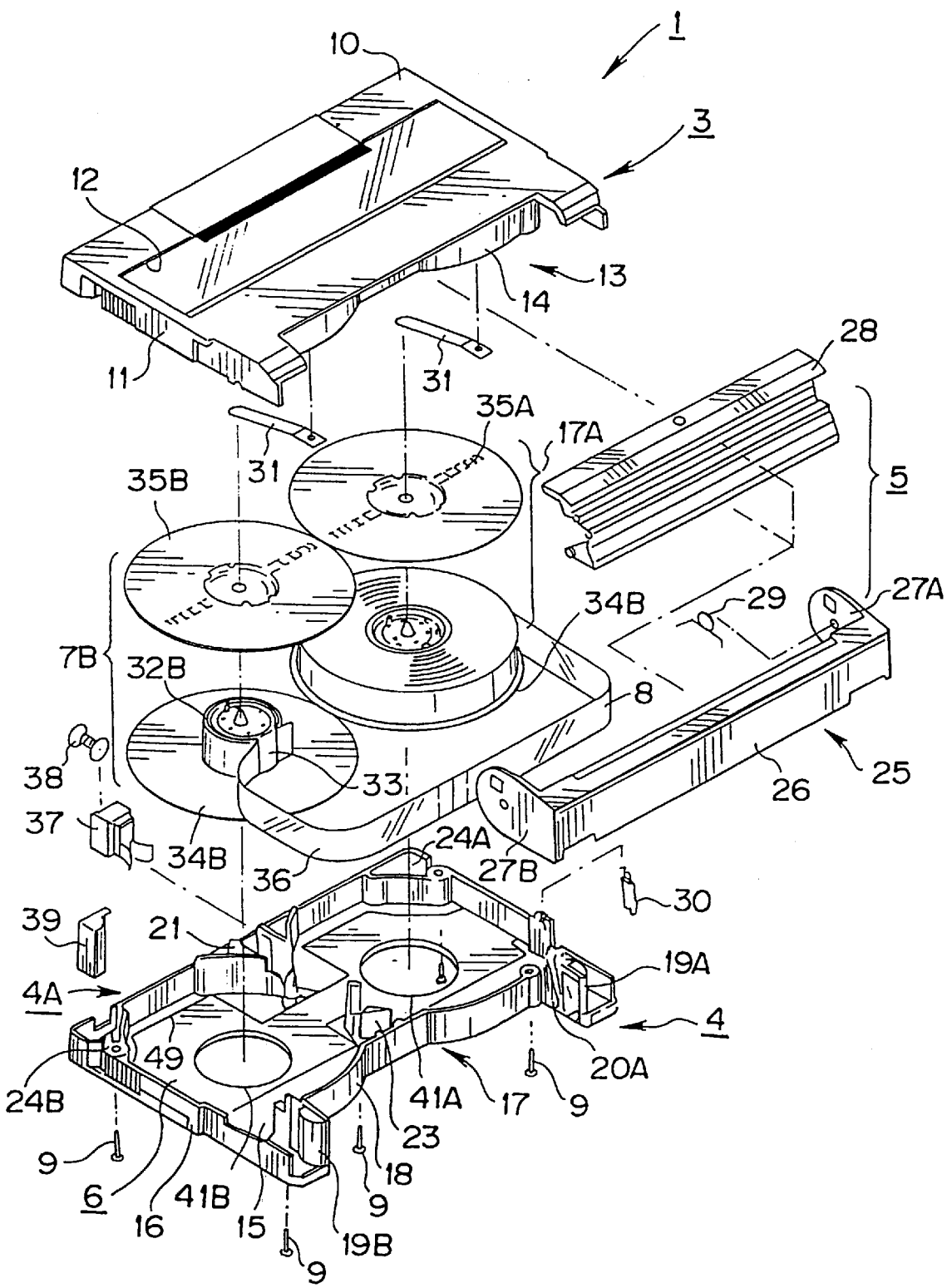
FIG. 5 is an exploded perspective view of the tape cassette shown in FIG. 4.
Figure 7:
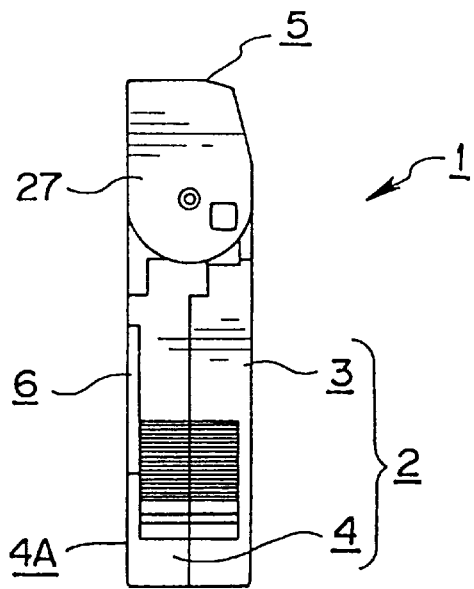
FIG. 7 is a plan view of the tape cassette shown in FIG. 4.

Referring to FIGS. 4, 5 and 7, the tape cassette 1 has an upper cassette half 3, molded in an rectangular shape from a synthetic resin material, with a front side 13 opened, and a lower cassette half 4, together making up a cassette main body unit 2. The lower cassette half 4 is made up of a frame unit 4A of synthetic resin formed as a thin box having a font side 17 and a bottom wall 15 partially opened and a metallic plate 6 integrated to the bottom wall 15 by insertion molding, as will be explained in detail subsequently. On the front side of the tape cassette 1 is rotatably mounted a lid assembly 5 for opening/closing a spacing for loading H formed on the front side of the cassette main body unit 2 by opened front sides 13, 17, as shown in FIG. 8.

Figure 6:
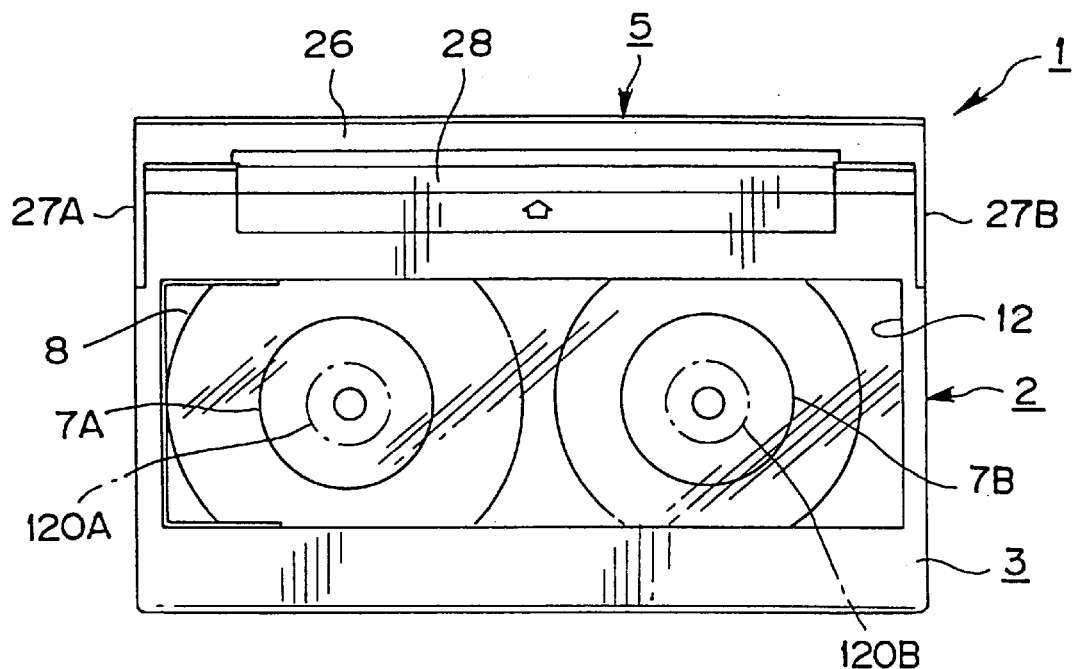
FIG. 6 is a plan view of the tape cassette shown in FIG. 4.
Figure 8:
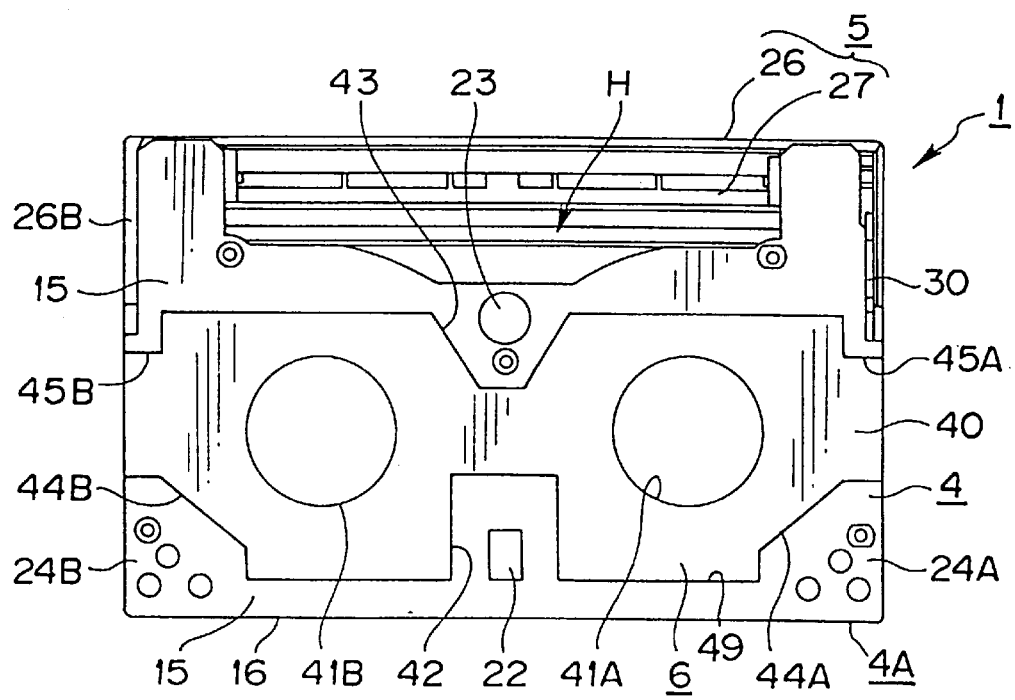
FIG. 8 is a bottom view of the tape cassette shown in FIG. 4.

Within the main cassette body unit 2 are rotatably housed a pair of tape reels 7A, 7B around which is placed a magnetic tape 8 having a width of 8 mm, as shown in FIGS. 6 and 8. The magnetic tape 8 is pulled from the tape reel 7A and guided along the spacing for loading H by a tape guide unit as later explained so as to be taken up on the opposite side tape reel 7B. The state of the magnetic tape 8 is viewed from outside via a reel window 12 provided on the upper cartridge half 3.

The upper half 3, formed of, for example, a synthetic resin, such as polycarbonate resin or an ABS resin, as described above, is molded in a substantially thin box shape with a transverse rectangular main wall 10 and a peripheral wall 11 formed upright on an outer peripheral portion excluding the front side 13. The main wall 10 is provided with the above-mentioned reel window 12. This reel window 12 is constituted a transparent portion by polycarbonate resin in order to permit the state of winding of the magnetic tape 8 around the tape reel 7 to be viewed and to inhibit intrusion of dust and dirt into the interior of the cassette main body unit 2.

On the inner surface of the main wall 10 of the upper cassette half 3 is integrally formed a guide wall 14 on the inner side of the opened front side 13. The guide wall 14 is an arcuate wall extending from a mid portion towards both lateral sides in order to provide a guide wall for holding the outer peripheral portion of the tape reel 7. Although not shown, a plurality of studs for integrally connecting the lower cassette half 4 to the inner surface of the main wall 10 by set screws 9 are provided on the inner surface of the main wall 10.

The lower cassette half 43 is made up of the frame unit 4A of synthetic resin and a metallic plate 6 integrated to the frame unit 4A of synthetic resin by insertion molding to the frame unit 4A of synthetic resin. The frame unit 4A of synthetic resin is also formed of, for example, ABS resin, in a substantially thin box shape, by the transverse rectangular bottom wall 5 and an outer peripheral wall 16 formed upright on an outer periphery excluding the front side 17. The frame unit 4A of synthetic resin has, on its bottom wall 15, a bottom opening 49 which is widely opened except the front and rear mid sides and rear corners and the metallic plate 6 is integrated for occupying the bottom opening 49. These front and rear mid sides and rear corners represent as a loading reference area for the video tape recorder, as will be explained subsequently.

Figure 9:
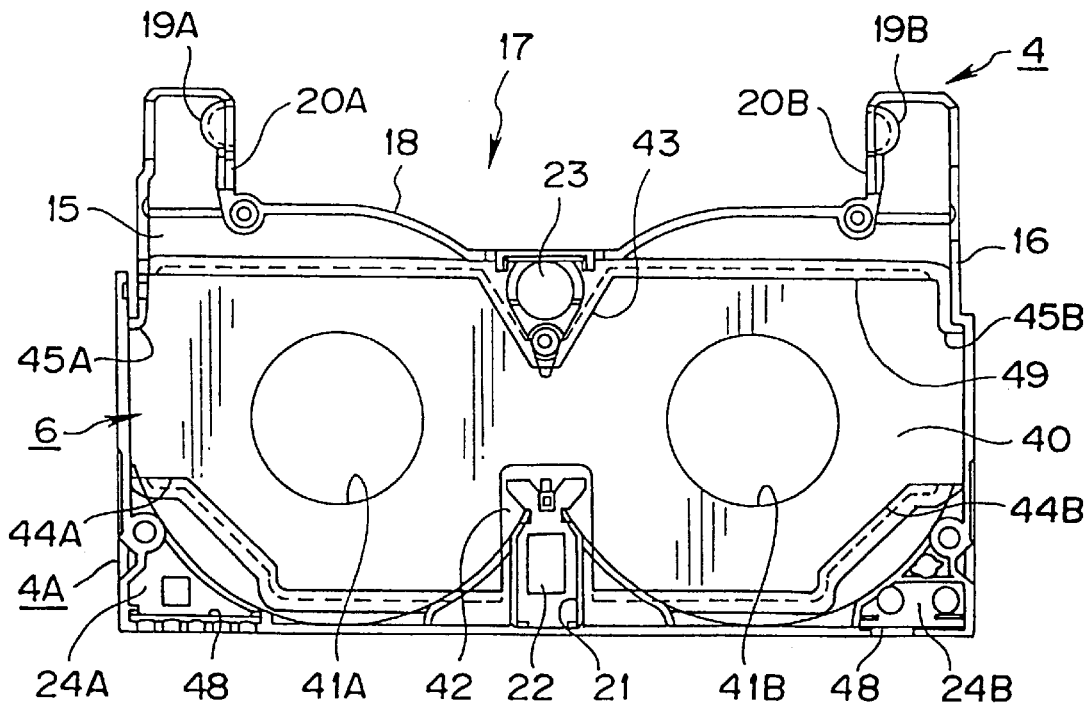
FIG. 9 is a plan view of a lower cassette half making up a cassette main body portion of a tape cassette according to the present invention.

On the frame unit 4A of synthetic resin is protuberantly formed a guide wall 18 which is disposed on the inner surface of the bottom wall 15 and on the inner side of the opened front side 17, as shown in FIG. 9. The guide wall 18 is an arcuate wall extending from a mid part towards both lateral sides and cooperates with the guide wall 14 of the upper cassette half 3 for constituting a portion of a reel guide wall holding the outer peripheral part of the tape reel 7.

The frame unit 4A of synthetic resin has both rear side corners a reel lock unit 21 as later explained and an upstanding wall encircling a rear end detector 23 as shown in FIG. 9. The area surrounded by the upstanding wall and the guide wall 18 defines a tape reel rotation area R within which the tape reel 7 is rotated freely. The bottom opening 49 is formed within this tape reel rotation area R.

A plurality of studs are formed in register with those on the upper half 3 on the bottom wall 15 of the frame unit 4A. Thus, after the respective members as later explained are assembled together, the outer peripheral wall section 11 of the upper cassette half 3 and the outer peripheral wall section 16 of the lower cassette half 4 are abutted and secured to each other by the set screws 9 from the bottom side of the lower cassette half 4 for constituting the cassette main body unit 2 as shown in FIG. 8. On the front side of the cassette main body unit 2 is defined the above-mentioned spacing for loading H by cooperation of the opened front side 13 of the upper cassette half 3 and the opened front side 17 of the lower cassette half 4, as shown in FIGS. 6 and 7.

Turning to the frame unit 4A, both lateral side portions on both sides of the opened front side 17 are extended forwards and two opposing tape guide portions 19A, 19B are formed in the extended portions. These tape guide portions 19 are formed with outer surfaces of arcuate cross-section for being engaged by the magnetic tape 8 pulled out from the tape reel 7, as will be explained subsequently. On the inner surface of the tape guide unit 19 are formed lid guide grooves 20A, 20B. These lid guide grooves 20A, 20B rotatably and vertically movably support a front lid 25 constituting the lid assembly 5 as will be explained subsequently.

Figure 10:
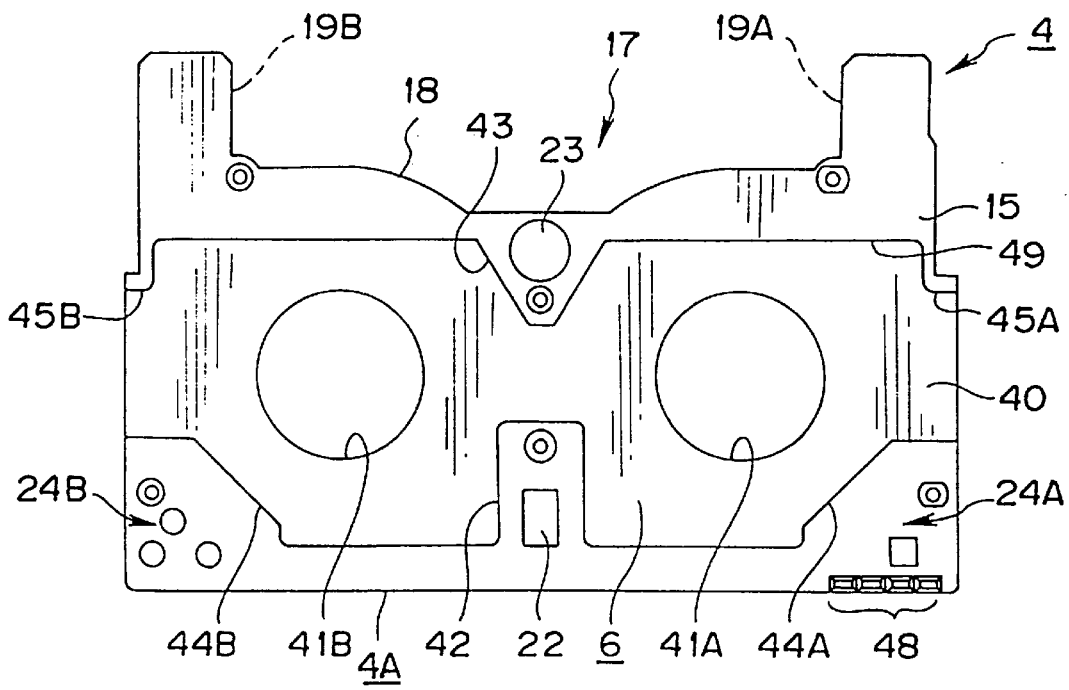
FIG. 10 is a bottom view of the lower cassette half.

The frame unit 4A is integrally formed with a reel lock unit 21 at a mid portion on the back surface of the bottom wall 15, as shown in FIGS. 9 and 10. The reel lock unit 21 is made up of a pair of guide wall sections for movably housing a reel lock member 37. The reel lock unit 21 is made up of a pair of guide walls extending parallel to each other in the fore-and-aft direction. Into the reel lock guide groove 22 is intruded a reel unlock member on the video tape recorder when the tape cassette 1 is loaded on the video tape recorder. In other terms, the reel lock unit 21 constitutes a portion of the loading reference portion at the time of loading of the tape cassette 1 on the video tape recorder.

At a mid portion on the front side of the bottom wall 15 of the frame unit 4A is integrally formed a terminal end detector 23 in register with the reel lock guide unit 21, as shown in FIGS. 9 and 10. This terminal end detector 23 is made up of a light source intrusion opening traversing the bottom wall 15 and a tubular protrusion formed around the light source intrusion opening. With the terminal end detector 23, when the tape cassette 1 is loaded on the video tape recorder, a light source constituting a terminal end detection mechanism on the video tape recorder is intruded into the interior of the cassette main body portion 2. Thus the terminal end detector 23 also constitutes a part of the loading reference portion at the time of loading of the tape cassette 1 on the video tape recorder.

The light radiated from the light source is conducted from both lateral sides of the tubular protrusion towards the lateral side along the inner surface of the guide wall 18 to traverse the running path of the magnetic tape 8 running between the outer peripheral wall 16 and tape guides 19A, 19B as later explained so as to be detected by a light receiving element of a terminal end detection unit on exiting to outside.

The frame unit 4A is provided with design statement detection units 24A 24B on both corners on the rear side thereof, as shown in FIGS. 9 and 10. These design statement units 24A, 24B are made up of plural detection holes opened on the basis of design statements, such as type, length or recording density of the magnetic tape 8. Although not shown in detail, these detection holes are formed via annular thin-walled portions disposed at patterned positions. These thin-walled portions are ruptured to produce the detection holes at respective corners of the frame unit 4A of synthetic resin. When the tape cassette 1 is loaded on the video tape recorder, the presence or absence of the detection holes of the design statement detection units 24A, 24B is detected by a detection member of a design statement detection mechanism on the video tape recorder for detecting the design statements. Therefore, the design statement detection unit 24 also constitutes a part of the loading reference portion at the time of loading of the tape cassette 1 on the video tape recorder.

An external memory unit 48 is arranged at a corner of the frame unit 4A of synthetic resin. Although not shown in detail, the external memory unit 48 is made up of a storage element and input/output terminals, as shown in FIG. 10. The state of use or the control information, for example, is recorded on the memory element. The input/output terminal is arranged facing the rear outer peripheral wall of the frame unit 4A of synthetic resin. When the tape cassette 1 is loaded on the video tape recorder, a connector of the information recording/reproducing mechanism is connected to the input/output terminal. The information recorded on the memory element of the tape cassette 1 is reproduced by the information recording/reproducing apparatus. Alternatively, the pre-set information is recorded on the memory element by the information recording/reproducing apparatus.

On the opposite side corner of the frame unit 4A is arranged a mistaken recording inhibiting member 39, as shown in FIG. 9. This mistaken recording inhibiting member 39 is switched to two positions of opening or closing mistaken recording inhibiting holes formed on the corners. If the mistaken recording inhibiting member 39 is set to a first position of closing the mistaken recording detection opening, the mistaken recording inhibiting member 39 inhibits intrusion of the detection member of a mistaken recording detection mechanism of the video tape recorder into the mistaken recording detection hole for enabling recording of information signals on the magnetic tape 8.

On the other hand, if the mistaken recording inhibiting member 39 is set to its second position of opening the mistaken recording detection opening, the detection member of the mistaken recording detection mechanism of the video tape recorder is intruded into the mistaken recording detection opening for disabling recording of information signals on the magnetic tape 8. Thus the mistaken recording detection openings also constitute a part of the loading reference portion at the time of loading of the tape cassette 1 on the video tape recorder.

The lid assembly 5 mounted on the cassette main body unit 2 is made up of the front lid 25, a back lid 28, a lid spring 29 and a lid cam 30, as shown in FIG. 5. The front lid 25 is formed as a transversely extending substantially U-shaped assembly made up of a major surface portion 26 and lateral surface portions 27A, 27B having pivots engaged in pivot holes formed on the lateral surfaces of the cassette main body unit 2. The major surface portion 26 is of a shape and a size sufficient to close the spacing for loading H formed on front side of the cassette main body unit 2.

The front lid 25 has its lateral side portions 26 supported for rotation on the cassette main body unit 2, with the major surface portion 26 thereof being disposed on the front side of the tape guide 1. The front lid 25 is biased in a direction of closing the spacing for loading H of the cassette main body unit 2 under the elastic force of the lid spring 29 comprised of a torsion spring loaded on the pivot.

The back lid 28 is formed as a substantially U-shaped member having an outer size sufficient to close the opened front side 13 of the upper cassette half 3, and is rotatably supported by the upper cassette half 3 so as to be disposed inwardly of the major surface portion of the front lid 25. The back lid 28 has on its lateral side edges cam protrusions engaged with the lid guide 20, while having, on its lateral side, a cam engaged with the lateral side 27A of the front lid 25. This back lid 28 is assembled in the cassette main body unit 2 so that the major surface of the back lid is disposed at a distance from the major surface portion of the front lid 25 for defining a space in which to extend the magnetic tape 8 as will be explained subsequently.

The lid cam 30 is rotatably assembled on a cam mounting portion integrally formed with the outer peripheral wall of the lower cassette half 4. Although not shown, the lid cam 30 has its one end engaged with a cam portion formed on the inner surface of the foremost part of the lateral surface portion 27A of the front lid 25, with its other end facing a lid opening groove formed on the frame 4A formed of synthetic resin.

The lid assembly 5, arranged as described above, closes the front side of the cassette main body unit 2 under the elastic force of the lid spring 29, as shown in FIGS. 6, 7 and 8. When the tape cassette 1 is loaded on the video tape recorder, the lid cam 30 of the lid assembly 5 is turned by a lid opening member provided on the video tape recorder. By the operation of the lid cam 30, the front lid 25 is turned against the spring force of the lid spring 29 for opening the front side of the cassette main body portion 2. Also, by the operation of the front lid 25, the back lid 28 of the lid assembly 5 is turned in unison along the lid guide 20. By the rotation of the lid assembly 5, the spacing for loading H, formed on the front side of the cassette main body unit 2 of the tape cassette 1 is opened.

Left-side and right-side tape reels 7 are biased towards the lower cassette half 4 by a pair of reel springs 31A, 31B mounted on the inner surface of the upper cassette half 3, as shown in FIG. 5. The tape reels 7A, 7B are prohibited by these reel springs 31A, 31B against performing vertical idle movement within the interior of the cassette main body unit 2. These tape reels 7 include tubular hubs 32A, 32B around which the magnetic tape 8 is wound, clampers 33A, 33B for securing the end of the magnetic tape 8 to these hubs 32A, 32B, lower flanges 34A, 34B formed as one with the hubs 32A, 32B, and upper flanges 35A, 35B facing the lower flanges 34A, 34B and associated with the hubs 32A, 32B, respectively.

The hubs 32A, 32B are provided with hub holes, not shown, engaged by reel driving shafts 120A, 120B of the video tape recorder, respectively, for facing reel bearing holes 41 provided in the metal plate 6, as will be explained subsequently. On outer peripheral portions of the hubs 32A, 32B are formed engagement grooves engaged by the dampers 33A, 33B designed for clamping and securing a leader tape 36 connected to the distal end of the magnetic tape 8.

The entire outer periphery of each of the lower flanges 34A, 34b is formed with peripheral teeth. The tape reels 7A, 7B are usually prohibited from performing rotational idle movement by a lock lever of the reel lock member 37 housed within the reel lock unit 21 being engaged with the outer peripheral teeth of the lower flanges 34A, 34B. When the tape cassette 1 is loaded on the video tape recorder, the reel unlock members, intruded from the reel lock guide groove 22, move the reel lock members 37 to release the locked state and hence permit rotation of the tape reels 7A, 7B.

The leader tape 36 is constituted by a transparent tape to permit transmission of the light radiated from the light source of the video tape recorder and entering the terminal end detector 23. Of course, the magnetic tape 8 has a recording layer and hence is rendered non-transparent so that it interrupts light radiated from the light source of the terminal end detecting unit. Thus, with the tape cassette 1, the possible presence of light transmitted through the leader tape 36 and leaking out from the lateral surface of the main cassette body unit 2 is detected by the video tape recorder for detecting the terminal end of the magnetic tape.

The magnetic tape is reeled out forwards from the outer periphery of the tape reel 7A for engagement with the tape guide 19A so as to be supplied into the spacing for loading H. The magnetic tape 8 traverses this spacing for loading H and is engaged with the opposite side tape guide 19B so as to be then supplied inwards and taken up on the periphery of the opposite side tape reel 7B. When traversing the spacing for loading H, the magnetic tape 8 is extended in a space defined between the front lid 25 and the back lid 28 of the lid assembly 5 for prohibiting its contamination or destruction.

When the tape cassette 1 is loaded on the video tape recorder, the lid assembly 5 is turned as described above for opening the spacing for loading H, so that the magnetic tape 8 is exposed to outside at a position ahead of the cassette main body unit 2. In this state, the magnetic tape 8 is reeled out from the unlocked tape reel 7 by a tape loading member intruded into the spacing for loading H in order to effect loading in a pre-set manner.

Figure 13:
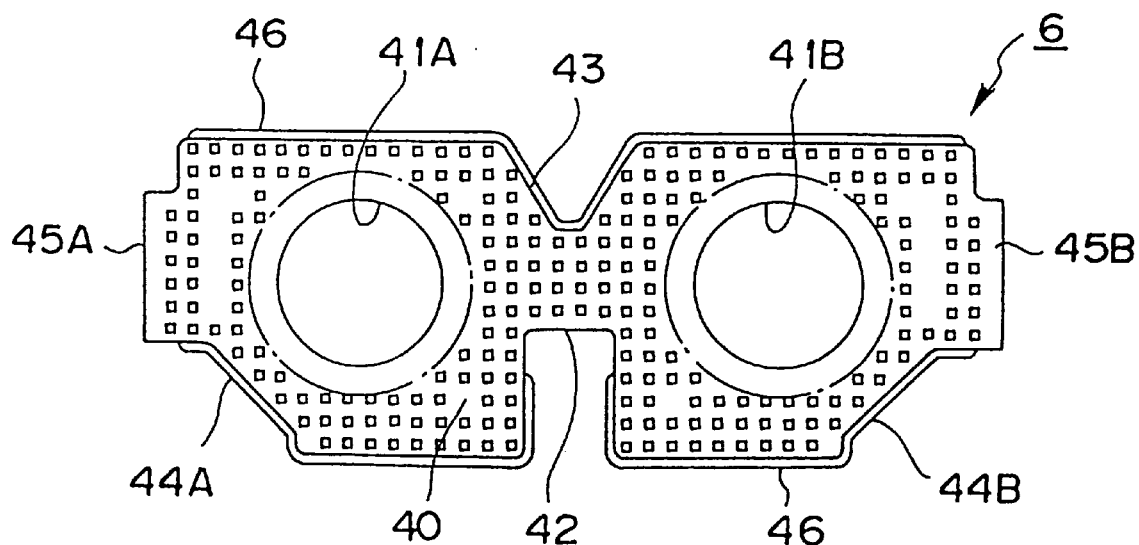
FIG. 13 is a plan view of a metallic plate insertion-molded in a frame portion constituting the lower cassette half.

The metallic plate 6 constituting the lower cassette half 4 has the operation of imparting pre-set weight to the tape cassette 1 and of holding mechanical strength against torsion or warping, and is formed by punching an aluminum plate or an aluminum alloy plate. The metal plate 6 is basically of a transversely elongated rectangle having a proximal portion 40 of a longitudinal length substantially equal to that of the frame unit 4A of synthetic resin and a width slightly smaller than the diameter of the tape reel rotation area R, as shown in FIG. 13. The proximal portion 40 of the metallic plate 6 has a pair of longitudinally spaced apart reel bearing holes 41A, 41B. These reel bearing holes 41A, 41B expose the hub holes of the tape reels 7 accommodated within the cassette main body unit 2, as explained previously. Thus, when the tape cassette 1 is loaded on the video tape recorder, the tape driving shafts 120, engaged in the hub holes for rotating the tape reels 7, are intruded into these reel bearing holes 41.

The metal plate 6 is formed with a reel lock clearance 42 and a terminal end detection clearance 43 for extending from both transverse ends of the proximal portion 40 to an area intermediate between the reel bearing holes 41A, 41B. The metal plate 6 is also formed with design statement detection clearances 44A, 44B at both side corners of the proximal portion 40. The metal plate 6 is also formed with protruding edges 45A, 45B on both longitudinal ends of the proximal end 40 and an allowance for insertion 46 is integrally formed on substantially the entire area of the outer peripheral edge excluding the protruding edges 45A, 45B.

Figure 12:
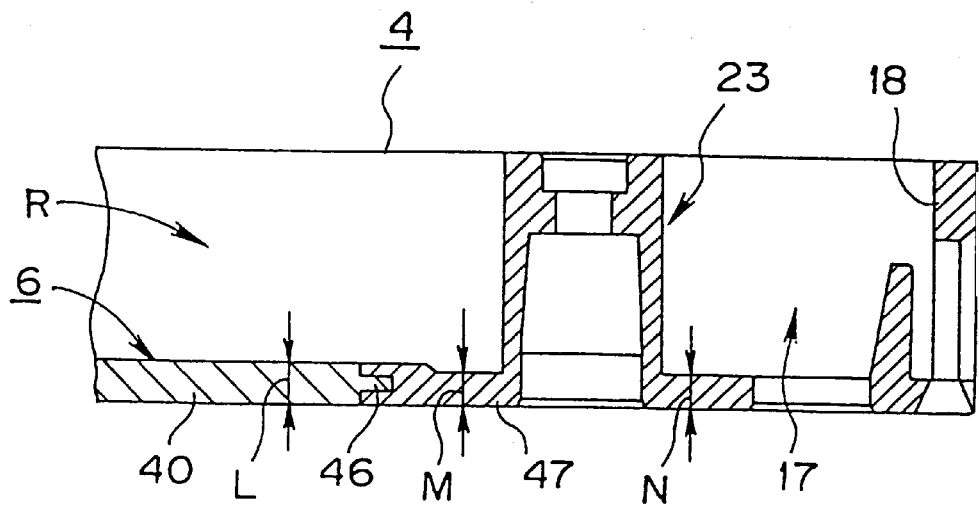
FIG. 12 is a longitudinal cross-sectional view showing essential portions of the lower cassette half.

In a state in which the metallic plate 6 is insertion-molded into a bottom aperture 49 of the frame 4A of synthetic resin, the outer extreme ends of the protruding edges 45A, 45B are flush with the outer peripheral wall 11 of the frame unit 4A formed of synthetic resin, as shown in FIGS. 7 and 12. The above-described metallic plate 6 is placed within a cavity of a metal mold registering with the bottom aperture 49 during the step of molding of the frame 4A, and the synthetic resin is injected thereon for insertion molding the metallic plate in the frame unit 4 for forming the lower cassette half 4. By injecting the resin on both the upper and lower surfaces of the insertion allowance 46, this insertion allowance 46 performs the role of a mortise and tenon for the opening edge of the bottom aperture 49, so that the metallic plate 6 is positively integrated to the frame unit 4A, as shown in FIG. 12. By virtue of the insertion allowance 46, there is produced no gap between the bottom aperture 49 and the metal plate 6 despite a larger difference of the thermal contraction ratio between the frame unit 4A and the metallic plate 6. In addition, insertion allowance 46 protuberantly formed on the entire periphery of the metallic plate 6 is vertically symmetrical with respect to the centerline in the direction of thickness to permit charging of the resin material uniformly on both the upper and lower sides of the metallic plate. The result is that molding distortion for the frame unit 4A or extraneous pressure acts on the metallic plate 6 thus assuring uniform mechanical strength at the opening edge of the bottom aperture 49.

The metallic plate 6 is integrated with the frame unit 4A with the clearances 42, 43 in register with associated portions of the frame unit 4A, as shown in FIGS. 8 and 9. That is, the reel lock clearance 42 is positioned in register with the reel lock unit 21, while the terminal end detection clearance 43 is positioned in register with the terminal end detection unit 23 and the design statement detection clearances 44A, 44B are positioned in register with the design statement detection units 24A, 24B, respectively. The protruding edge 45 nips into the peripheral wall 16 of the frame unit 4A.

Figure 11:
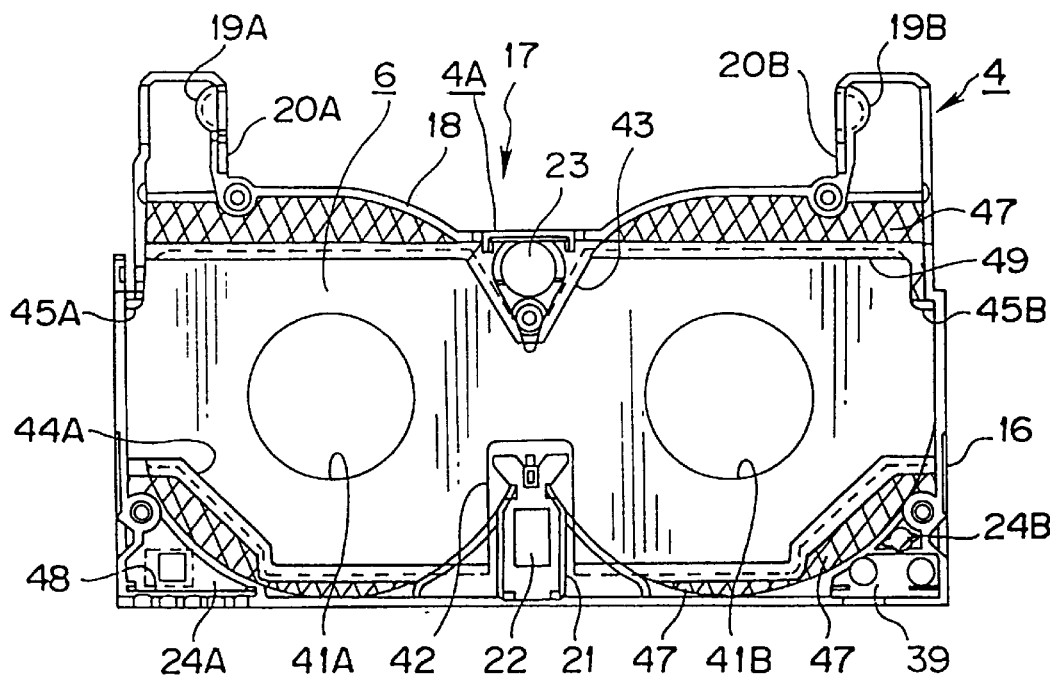
FIG. 11 is a plan view illustrating a thin-waled area formed in the bottom surface of the lower cassette half.

The thickness of the bottom wall 15 of the frame unit 4A is substantially equal to the thickness L of the metallic late 6 at the opening edge of the bottom aperture 49. However, the other portions of the tape reel rotation area R shown shaded in FIG. 11 are formed as thin-waled portions having a slightly smaller thickness M as shown in FIG. 12.

Meanwhile, the tape guide 19 on the front side of the frame unit 4A has a thickness N substantially equal to the thickness L of the metallic plate 6 for assuring mechanical strength. Due to the significant difference in thermal contraction ratio between the metallic plate 6 and the frame unit 4A of the lower cassette half 4, the force of thermal contraction of the lower cassette half 4 acts strongly on the metallic plate 6.

However, since the opening edge of the bottom aperture 49 of the frame unit 4A of the lower cassette half 4 is reduced in wall thickness as described above, the effect of the force of thermal contraction of the frame unit 4A is reduced to maintain dimensional accuracy. In addition, the lower cassette half 4 has the protruding edge 45 of the metallic late 6 extended as far as the outer peripheral wall 11 of the frame unit 4A for assuring mechanical strength.

When the above-described tape cassette 1 is loaded on the video tape recorder, with the outer periphery and the bottom surface of the main cassette body unit 2 as the reference surfaces, the lid assembly 5 is turned by the lid opening member of the video tape recorder for opening the spacing for loading H on the front side of the tape cassette 1. The reel lock members 37 are moved by the reel unlock members intruded from the reel lock guide groove 14, against the elasticity of the reel lock spring 38, for unlocking the tape reel 7. By the loading unit of the video tape recorder intruded from the spacing for loading H, the magnetic tape 8 of the tape cassette 1 is pulled out to constitute a pre-set tape running path by way of performing a loading operation.

The reel driving shafts are intruded into the reel bearing holes 41 in the tape cassette 1 into engagement with reel bearing shafts of the tape reels. The tape reels 7A, 7B of the tape cassette 7 are run in rotation by the driving operation of the reel driving shafts as a result of tape driving operation such as recording/reproduction for reeling out or taking up the magnetic tape 8. Moreover, the detection holes of the design statement selectors 21A, 21B of the tape cassette 1 are detected by a detection mechanism for reading out the information recorded on the memory unit 48.

With the tape cassette 1, the lower cassette half 4 constituting the cassette main body unit 2 is constituted by the frame unit 4A of synthetic resin and the metallic plate 6 insertion-molded integrally on the bottom wall 15 thereof. Thus the tape cassette 1 is improved in mechanical strength against warping or distortion, while being increased in thickness. Thus, even if the tape cassette is subjected to vibrations emanating from the tape driving mechanism driving the tape reel, it is not oscillated to affect the running of the magnetic tape 8 thus assuring high precision recording/reproduction of information signals.

Moreover, with the present tape cassette 1, the mounting portion for movable members, such as reel lock member 37, engagement portions with such as reel unlock member or design statement detection members on the video tape recorder or loading reference surfaces for the vide tape recorder are formed on the frame unit 4A formed of synthetic resin. The result is that there is no risk of the operating members of the video tape recorder being abraded by the tape cassette 1 and hence the video cassette can be loaded in a correctly positioned state without producing mistaken operations.

In addition, since the bottom wall 15 of the frame unit 4A of the tape cassette 1 is reduced in thickness, the force of thermal contraction of the resin portion is significantly reduced to prevent warping or the like deformation of the metallic plate 6. Moreover, since the metallic plate 6 is strongly integrated to the opening edge of the bottom aperture 49 of the bottom wall 15 via the insertion allowance 46, and the frame unit 4A is improved in mechanical strength by the protruding edges 45 formed on the outer peripheral wall 15, it becomes possible to maintain the mechanical strength of the lower cassette half 4 of the tape cassette 1.

Since the frame unit 4A and the metallic plate 6 are joined together via the insertion allowance 46, there is no possibility of the gap being formed at the junction due to differential thermal contraction ratio or the junction being fractured due to the pressure applied from outside, thus improving mechanical strength against tension, warping or shearing. Besides, since no gap is produced between the opening edge of the bottom aperture 49 of the frame unit 4A and the outer peripheral edge of the metallic plate 6 by virtue of the insertion allowance 46, the outer appearance of the tape cassette 1 may be maintained, while there is caused no inconvenience such as intrusion of dust and dirt into the inside of the tape cassette 1 or deposition thereof on the magnetic tape.

Figure 14:
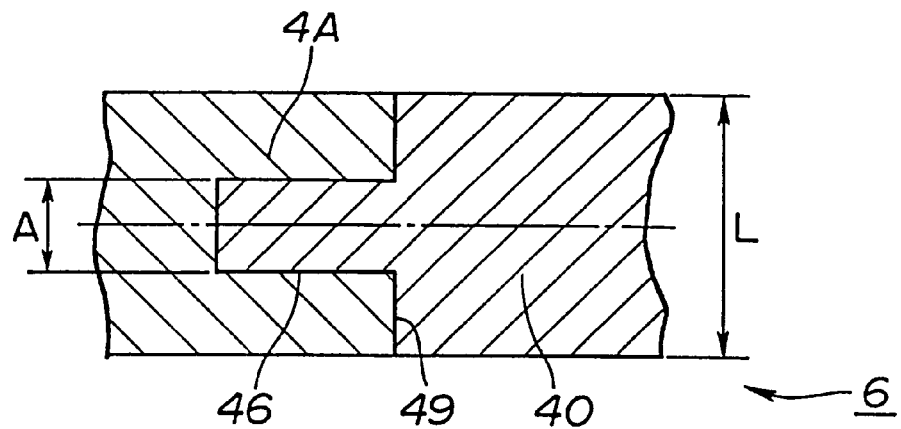
FIG. 14 is a longitudinal cross-sectional view showing other essential portions of the lower cassette half.

With the above-described tape cassette 1, the insertion allowance 46 formed integrally with the outer periphery of the metallic late 6 is of a rectangular cross-section, with a uniform thickness A, as shown in FIG. 14. However, the insertion allowance 46 is not limited to this specific shape and may be designed as insertion allowances 51, 53, 55 or 59 shaped as shown in FIGS. 15 to 18.

In the following description, the same reference numerals are used to depict components which are the same or equivalent components to those of the tape cassette 1, and the corresponding operation is omitted for simplicity.

Figure 15:
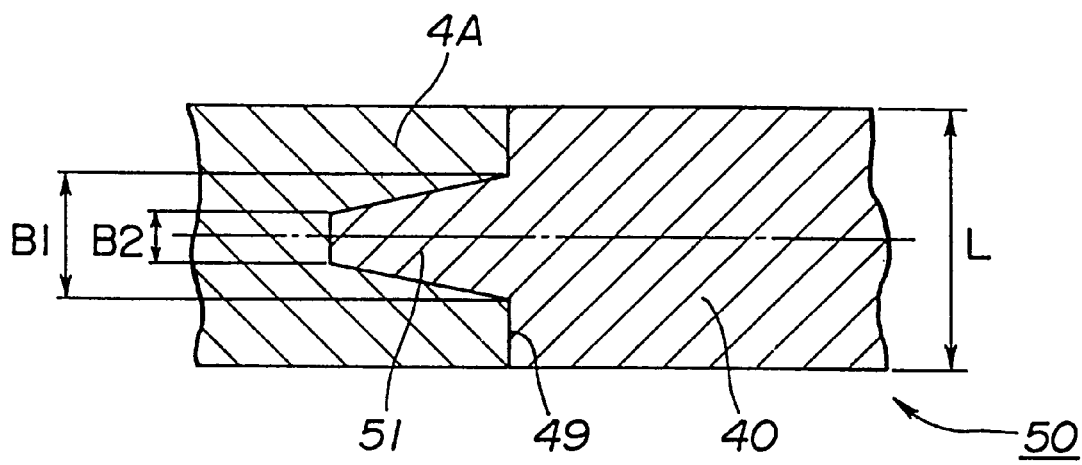
FIG. 15 is a longitudinal cross-sectional view showing essential portions of a modification of the lower cassette half.

FIG. 15 shows a metallic plate 50 integrally formed with the insertion allowance 51 having a thickness gradually reduced from the thickness B1 at the proximal end towards the distal end having a smaller thickness B2 in the from of a frustum of a cone. Of course, the thickness B1 of the insertion allowance 51 at the proximal end is smaller than the thickness L of the proximal end 40 of the metallic plate 50. In addition, the insertion allowance 51 is designed to be symmetrical in an up-and-down direction relative to the centerline in the direction of thickness of the proximal portion 40. Since the metallic plate 50 has the insertion allowance o a simpler shape, it may be produced easily by, for example, press working.

Similarly to the metallic plate 6 of the tape cassette 1, the metallic plate 50 having the above-described insertion allowance 51 is strongly integrated to the frame unit 4A of synthetic resin, with the insertion allowance 51 operating as a wedge with respect to the opening edge of the bottom aperture 49.

Figure 16:
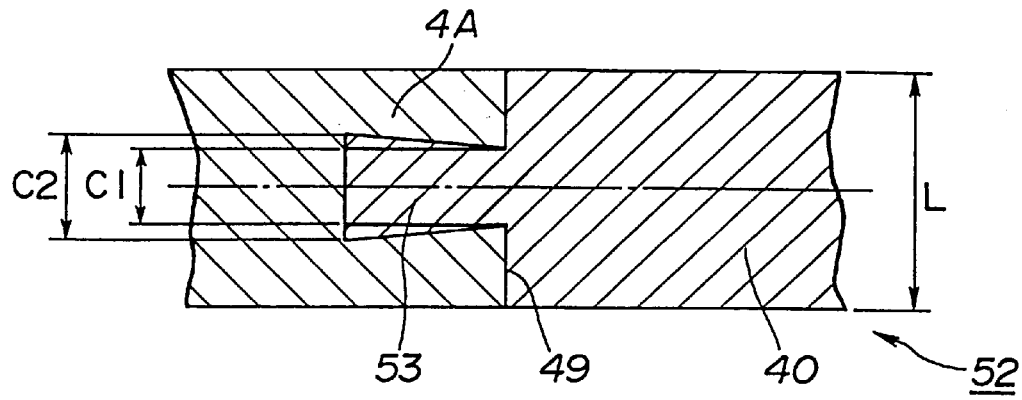
FIG. 16 is a longitudinal cross-sectional view showing essential portions of another modification of the lower cassette half.

FIG. 16 shows a metallic plate 52 having the insertion allowance 53 formed integrally with the outer periphery thereof. The insertion allowance 53 has the proximal end of a thickness C1 and a distal end of a thickness C2, with the thickness value increasing gradually from the thickness C1 to the thickness C2 such that the insertion allowance presents an inverted frustum in cross-section. Of course, the thickness C2 of the insertion allowance 51 at the distal end is smaller than the thickness L of the proximal end 40 of the metallic plate 50, while the insertion allowance 53 is designed to be symmetrical in an up-and-down direction relative to the centerline in the direction of thickness of the proximal portion 40.

Similarly to the above-described metallic plate 6, the metallic plate 52 having the insertion allowance 53 as described above is strongly integrated to the frame unit 4A of synthetic resin, with the insertion allowance 53 operating as a wedge relative to the opening edge of the bottom aperture 49. Since the insertion allowance 53 is of an inverted frustum in cross-section, the insertion allowance 53 produces a wedging action more effective than that produced by the insertion allowance 46 of the metallic plate 6, thus strongly bonding the metallic plate 52 to the cassette main body unit 4A.

Figure 17:
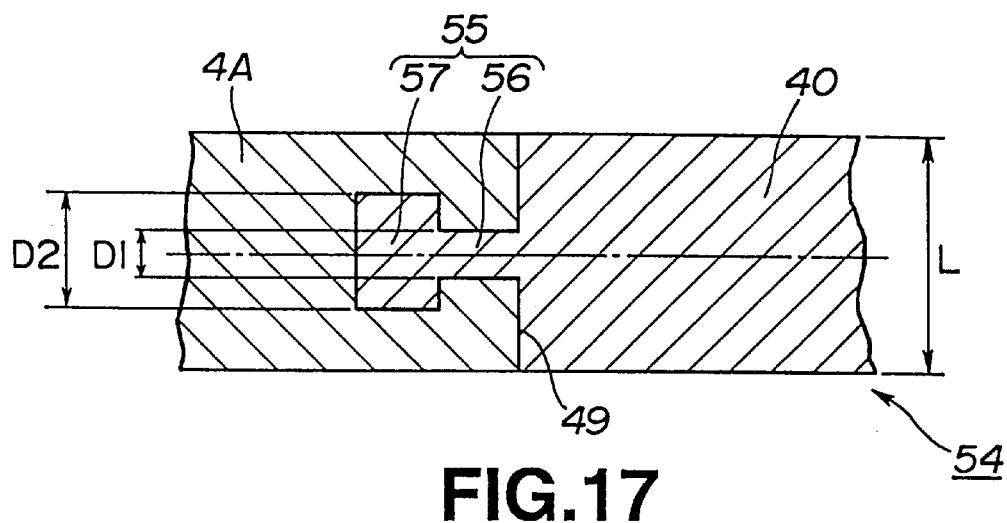
FIG. 17 is a longitudinal cross-sectional view showing essential portions of still another modification of the lower cassette half.

FIG. 17 shows a metallic plate 54 having the insertion allowance 55 protuberantly formed on the outer periphery thereof. The insertion allowance 55 is made up of a connecting portion 56 integrally protruded from the outer peripheral edge of the proximal portion 40 and a retention portion 57 formed as one with the distal end of the connecting portion 56. The retention portion 57 has a thickness D2 slightly larger than the thickness D1 of the connecting portion 56 and hence the insertion allowance 55 generally has a substantially T-shaped cross-sectional shape. Of course, the thickness D2 of the insertion allowance 55 is smaller than the thickness L of the proximal end 40 of the metallic plate 54, while the insertion allowance 55 is designed to be symmetrical in an up-and-down direction relative to the centerline in the direction of thickness of the proximal portion 40.

Similarly to the above-described metallic plate 6, the metallic plate 54 having the insertion allowance 55 as described above is strongly integrated to the frame unit 4A of synthetic resin, with the insertion allowance 55 operating as a wedge relative to the opening edge of the bottom aperture 49. Since the insertion allowance 53 is formed with the retention portion 57 extended in the direction of thickness, the insertion allowance 53 produces a wedging action more effective than that produced by the insertion allowance 52 of the metallic plate 53, thus strongly bonding the metallic plate 52 to the frame unit 4A.

Figure 18:
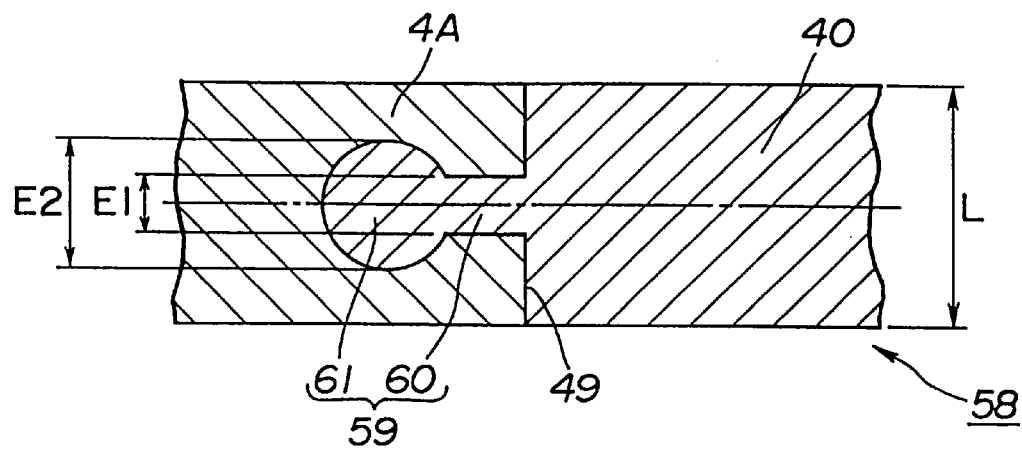
FIG. 18 is a longitudinal cross-sectional view showing essential portions of yet another modification of the lower cassette half.

FIG. 18 shows a metallic plate 58 in which the insertion allowance 59 is protuberantly formed as one on the outer periphery thereof and a retention portion 61 is formed as one on the distal end of the connecting portion 60. The retention portion 61 is circular in cross-section and has a diameter E2 slightly larger than a diameter E1 of the connecting portion 60 so that the retention portion is protruded in an up-and-down direction on the distal end of the connecting portion 60. Of course, the insertion allowance 59 has the diameter E2 of the retention portion 61 smaller than the thickness L of the proximal portion 40 of the metal plate 40, and is designed to be symmetrical in an up-and-down direction relative to the direction of thickness of the proximal portion 40.

Similarly to the above-described metallic plate 54, the metallic plate 58 having the insertion allowance 59 has the retention portion 61 protruded in an up-and down direction in the direction of thickness of the metallic plate 58, so that the insertion allowance 59 is strongly integrated to the frame unit 4A of synthetic resin with a wedging action exerted on the opening edge of the bottom aperture 49. Moreover, since the insertion allowance 59 has a circular cross-sectional shape devoid of corners, the resin material is charged uniformly on its periphery to prevent cracking or the like due to distortion.

Figure 19:
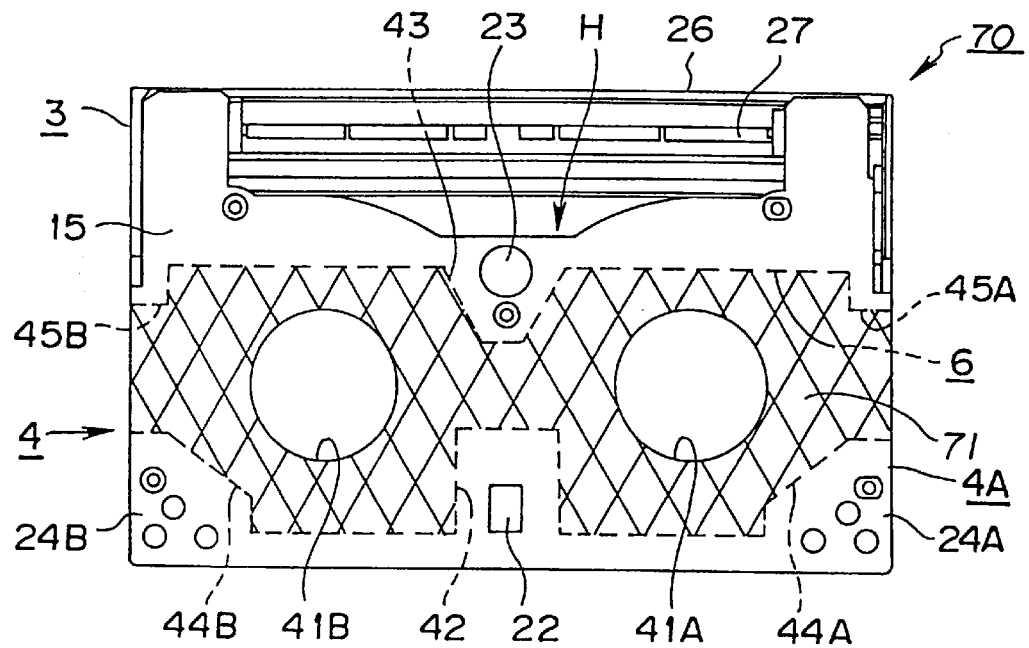
FIG. 19 is a bottom view showing a modification of the lower cassette half.

FIG. 19 shows a tape cassette according to the present invention in which a thin-walled resin layer 71 is formed on the surface of the metallic plate 6 integrally insertion-molded on the frame unit 4A to form the lower cassette half 4.

In FIG. 19, the same numerals are used to depict the components previously described and the corresponding description is omitted for simplicity.

In molding the lower cassette half 4 of the tape cassette 70, the metallic plate 6 is loaded in the cavity of a metal die registering with the bottom wall 15 of the frame unit 4A for injecting the resin material for molding the lower cassette half 4. The metal plate 6 is set on plural holding protrusions formed on a mold surface so as to be held in a slightly floated condition. These holding protrusions are formed upright on the mold surface with a height sufficient to permit the injected resin material to flow into a space defined between the mold surface and the metal plate 6.

With the resin material charged into the spacing defined between these holding protrusions, the surface of the proximal portion 40 is coated in its entirety with a thin-walled resin layer 51 for insertion molding the metal plate 6 in the frame unit 4A. Of course, the bottom wall 15 of the frame unit 4A is reduced in thickness for prohibiting the frame unit from being warped or otherwise deformed relative to the metallic plate 6.

Since the lower cassette half 4 of the tape cassette 70 is made up of the frame unit 4A of synthetic resin and the metallic plate 6 buried in the bottom wall 15 and coated with the resin layer 71, the tape cassette 70 may be improved in mechanical strength against warping or distortion while remaining unaffected by oscillations of the tape driving unit. The magnetic tape 8 is run in stability to permit high-precision recording/reproduction of information signals.

By virtue of the resin layer 71, the tape cassette 70 is loaded reliably in position on the video tape recorder without causing abrasion of various engagement members, while the frame unit 4A and the metallic plate 6 are positively integrated to each other for preventing accidental detachment of the metallic plate 6.

Figure 20:
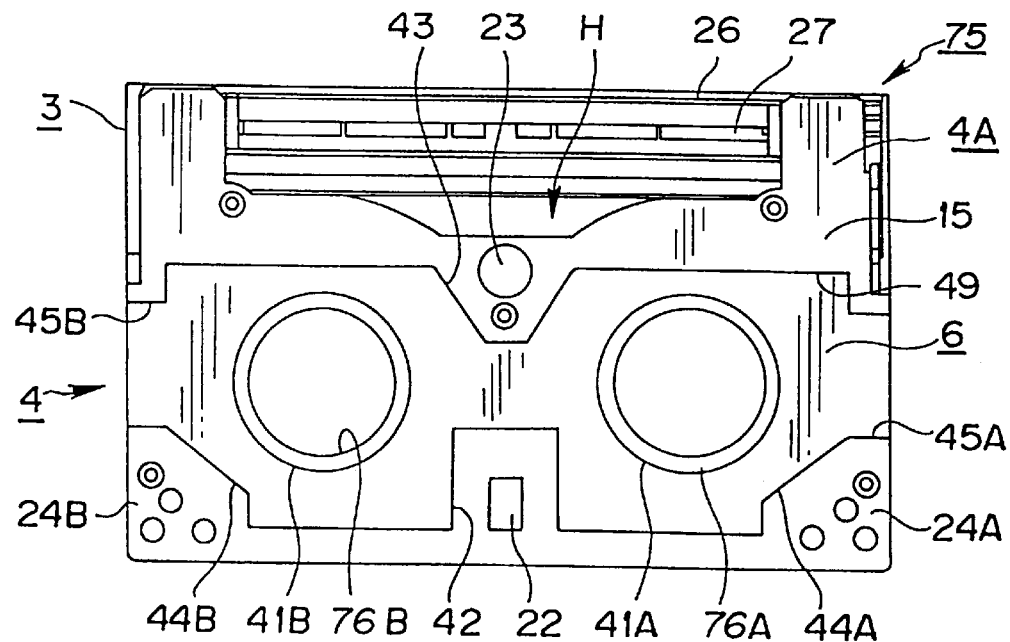
FIG. 20 is a bottom view showing another modification of the lower cassette half.

FIG. 20 shows a tape cassette 75 according to the present invention in which annular resin parts 76A, 76B are formed on the entire inner periphery of the reel bearing holes 41A, 41B of the metallic plate 6 which is then insertion-molded on the frame unit 4A for forming the lower cassette half 4. In FIG. 20, the same numerals are used to depict the components previously described and the corresponding description is omitted for simplicity.

In the molding step for the lower cassette half 4 of the tape cassette 75, the resin material is injected after loading the metallic plate 6 in a cavity of the mold registering with the bottom wall 15 of the frame unit 4A for forming the lower cassette half 4. The reel bearing holes 41 formed in the proximal portion 40 of the metal plate 6 are of inner diameter slightly larger than the outer diameter of the associated reel bearing holes in the mold. Although not shown in detail, the mold has annular holding protrusions slightly larger than the inside diameter of the reel bearing holes 41 of the metallic plate 6 at the outer rim of the associated protrusions.

The metallic plate 6 has the rim of the reel bearing holes 41 supported by the holding protrusions of the mold with the holding protrusions supporting the rim of the reel bearing holes 41, with the protrusions facing the reel bearing holes 41.

Thus, a spacing surrounded by the holding protrusions and the protrusions associated with the reel bearing holes is defined in the metal mold around the reel bearing holes of the metallic plate 6. The resin material injected into the cavity is also charged into this spacing.

The lower cassette half 4 is made up of the frame unit 4A of synthetic resin and the metallic plate 6 insertion-molded on the bottom wall 15 thereof. On the metallic plate 6 are formed resin layers 76A, 76B around the reel bearing holes 41. Thus, similarly to the tape cassette 1, the tape cassette 75 provided with the lower cassette half 4 may be improved in mechanical strength against warping or distortion by the metallic plate 6, while remaining unaffected by oscillations of the tape driving unit. The magnetic tape 8 is run in stability to permit high-precision recording/reproduction of information signals.

With the tape cassette 75, shown in FIG. 20, the resin layers 75, 75 operate for preventing the abrasion of the tape reels 7 of the reel driving shafts of the video tape recorder. In addition, the tape cassette 75 can be loaded in position by the various component parts formed precisely on the frame unit 4A formed of resin in order to perform pre-set operations.

Meanwhile, the outer periphery of the proximal portion of the metal plate 6 forming the lower cassette half 4 of the tape cassette 1 according to the present invention is formed with the reel lock clearance 42, terminal end detection clearance 43 and the design statement clearances 44A, 44B. In addition, the protruding edges 45 are integrally formed on both longitudinal edges of the metal plate 6. Thus the metal plate 6 has many arcuate corners by chamfering with, for example, 0.3R.

Figure 21:
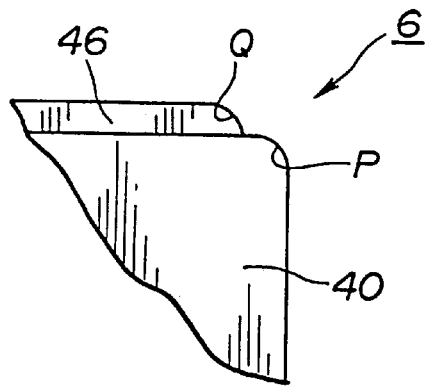
FIG. 21 is a plan view showing essential portions of a metallic plate constituting a lower cassette half of a tape cassette according to the present invention.

The corners of the insertion allowance 46 protuberantly formed on the outer rim of the metallic plate 6 are also rounded by chamfering with, for example. 0.3R, as shown in FIG. 13. Consequently, the insertion allowance 46 similarly have rounded corners. The insertion allowance 46 has corners Q at respective left and right longitudinal side edges. These corners Q are protuberantly formed at the outer periphery of the allowance slightly inwardly of both side edges of the proximal portion 40, as shown in FIG. 21. The remaining corners Q of the insertion allowance 46 are continuously formed along the outer rim of the proximal portion 40 for assuring mechanical strength.

By the above construction of the corners of the metallic plate 6 and the corners Q of the insertion allowance 46 for the lower cassette half 4, it is possible to assure precision and mechanical strength of the reel lock unit 21, terminal end detector 23 or the design statement detector 24 operating as the reference for the video tape recorder.

The corners P of the metallic plate 6 and the corners Q of the insertion allowance 46 are chamfered with 0.3R, as explained above, for increasing the mechanical strength of the lower cassette half 4 by a factor of approximately 1.3 as compared to that formed without chamfering. The larger the value of R, the higher becomes the effect of chamfering, such that, by setting the value to, for example, 0.5R to 1.0R, the mechanical strength can be increased by a factor of 1.5 to 2.0.

Since the frame unit 4A and the metallic plate 4 have different values of thermal contraction ratio, so that a difference in release resistance is produced at the time of ejection during insertion molding. However, since the corners P and Q are chamfered and rounded in shape, stress concentration may be evaded for preventing the phenomenon of whiting and cracking. By evading stress concentration at the corners of the lower cassette half 4A and the metallic plate 6, it becomes possible to improve mechanical strength of the lower cassette half 4 against warping or distortion.

Figure 22:
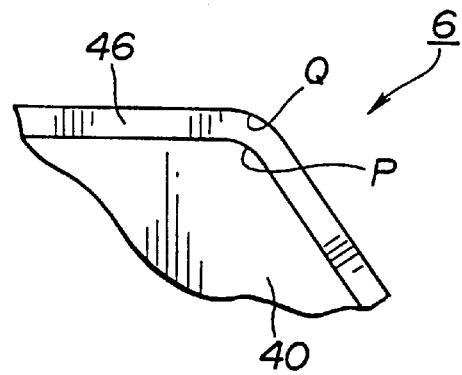
FIG. 22 is a plan view showing other essential portions of the metallic plate.
Figure 25:
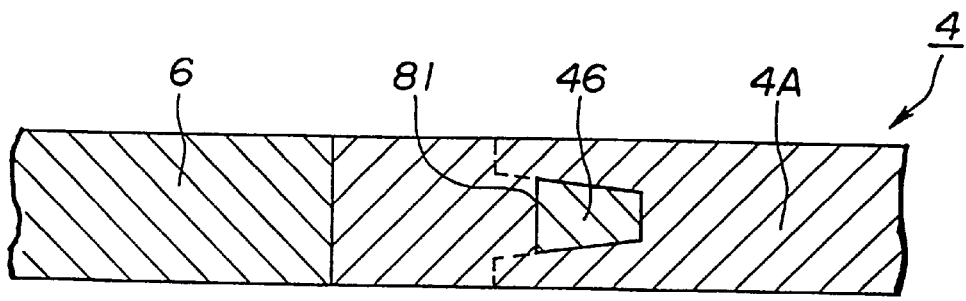
FIG. 25 is a longitudinal cross-sectional view showing the coupled state of the metallic plate with a frame portion.
Figure 23:
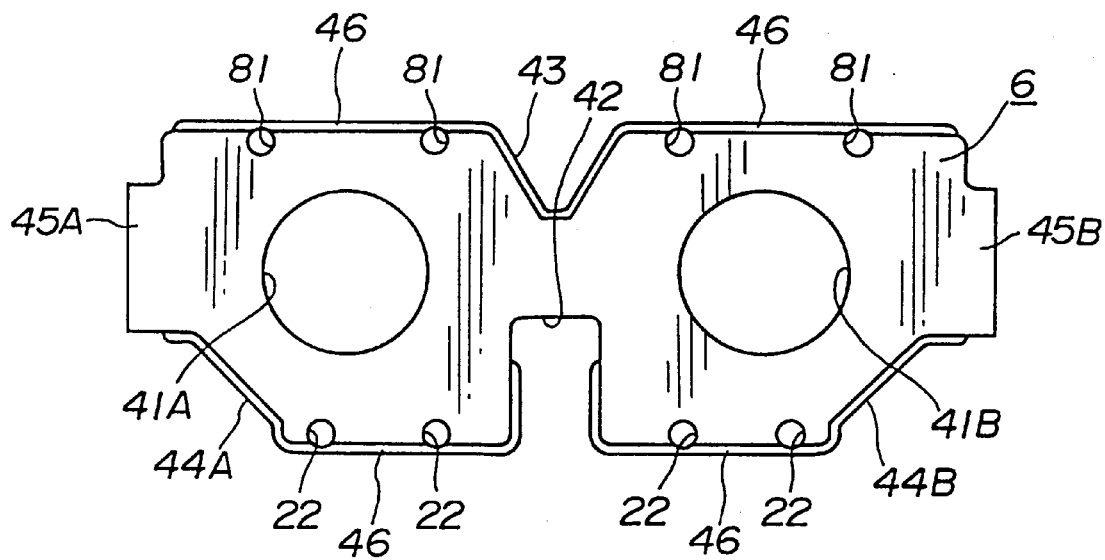
FIG. 23 is a plan view showing a modification of the metallic plate constituting a lower cassette half of a tape cassette according to the present invention.
Figure 24:
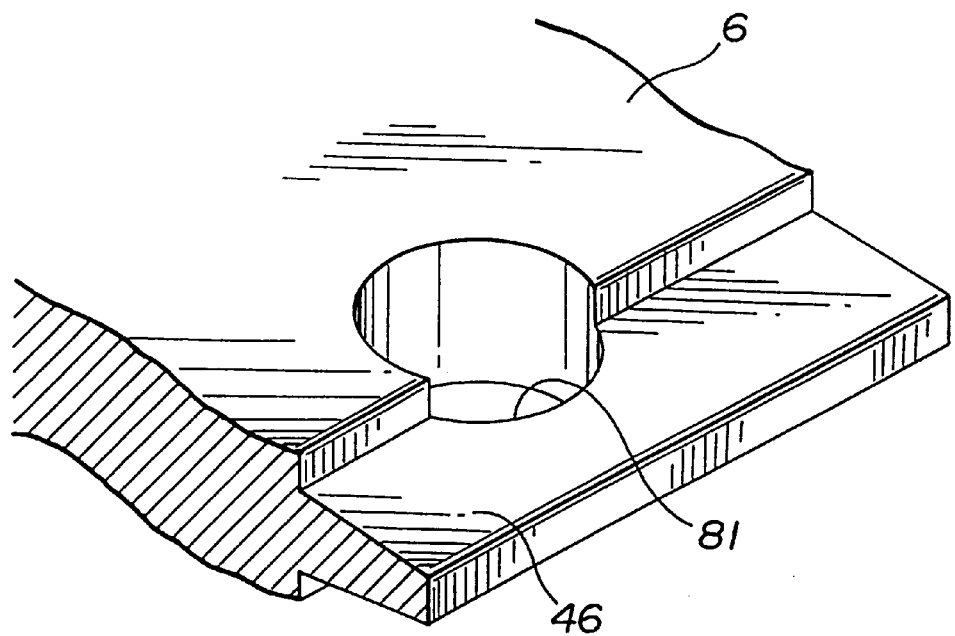
FIG. 24 is a perspective view showing essential portions of the metallic plate.

For realizing stronger connection between the frame unit 4A and the metallic plate 6 making up the lower cassette half 4 of the tape cassette 1 of the present invention, the metal plate 6 is formed with plural through-holes 81, as shown in FIGS. 22 and 23. These through-holes 81 are formed for partially affecting the insertion allowance 56. Into these through-holes 81 is also charged the synthetic resin constituting the frame unit 4A, as shown in FIG. 25. By this arrangement, the synthetic resin of the frame unit 4A is charged on the upper and lower surfaces of the insertion allowance 46 of the metallic plate 6 in continuation along the direction of thickness for assuring a stronger coupling between the metallic plate 6 and the frame unit 4A.

The lower cassette half 4 of the tape cassette 1 of the present invention, made up of the metallic plate 6 and the frame unit 4A, is formed using a metal mold device for molding 250.

That is, the lower cassette half 4 is formed by previously inserting the metallic plate 6 in a mold cavity of the metal mold device 250 and by charging the synthetic resin constituting the frame unit 4A.

Figure 26:
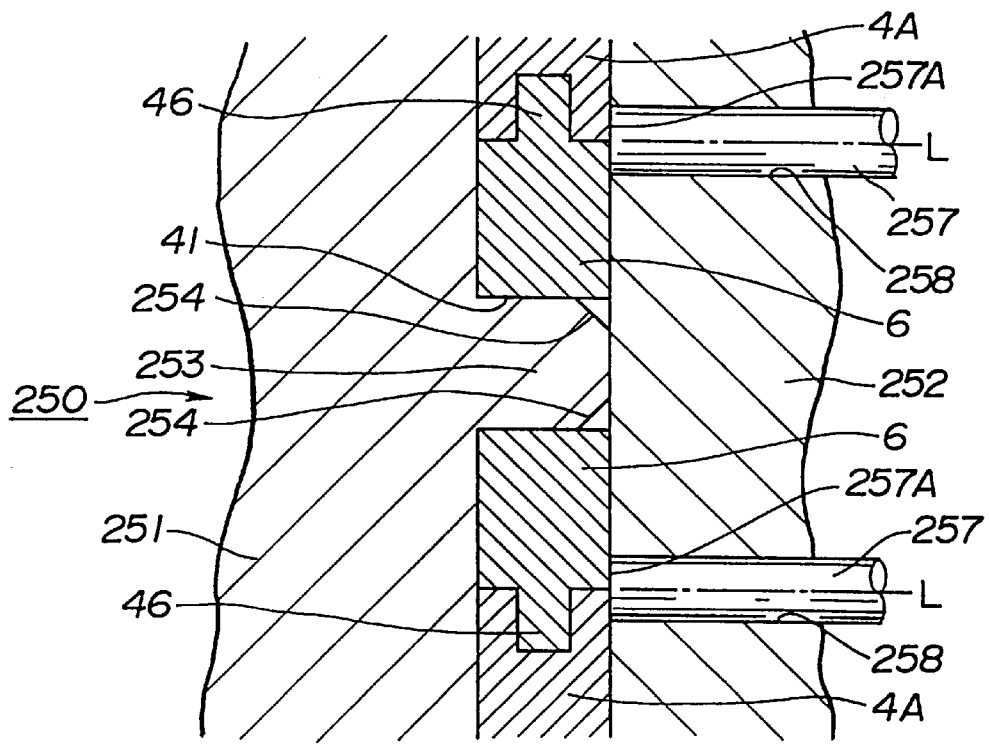
FIG. 26 is a longitudinal cross-sectional view showing essential portions of a metal mold device for molding a cassette half according to the present invention, with the metal mold device being shown in the mold clamping state.
Figure 27:
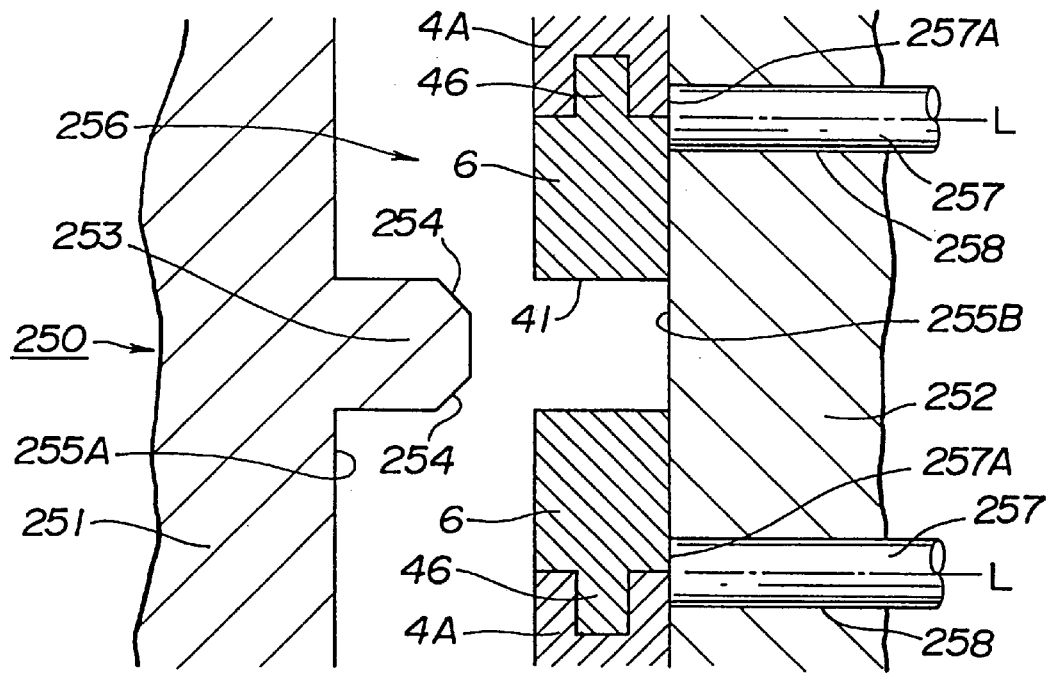
FIG. 27 is a longitudinal cross-sectional view of the metal mold device, with the metal molds being shown in the mold opening state.

Such metal mold device 250 has a stationary metal mold 251 in which the metallic plate 251 is loaded and a movable metal mold 252 placed facing the stationary mold 251 so as to be moved towards and away from the mold 251 for defining a cavity 256 for molding the lower cassette half 4 in cooperation with the stationary mold 251, as shown in FIGS. 26 and 27. It is noted that FIGS. 26 and 27 show the metal mold device 250 in the mold closing state and in the mold opening state, respectively.

On a cavity forming surface 255A of the stationary mold 251 are formed a pair of holding protrusions 253 for holding the metallic plate 6 in position. These holding protrusions 253 are spaced apart from each other by a distance registering with the reel bearing hole 41 of the metallic plate 6. The distance between these holding protrusions 253 is equal to the diameter of the reel bearing hole 41 of the metallic plate 6.

The holding protrusion 253 has, at its distal portion, a holding force adjustment portion 254 for adjusting the holding force exerted on the metallic plate. The holding force adjustment portion 254 is formed by chamfering for reducing the outer size of the protrusion 263 towards its distal end.

Although not shown, a sprue bushing having a gate for injecting molten synthetic resin into the inside of the cavity 256 is provided on the stationary metal mold 251.

The movable mold 252 is moved, by a driving unit, not shown, into and out of contact with the stationary metal mold 251. On the surface of the movable metal mold 252 facing the stationary metal mold 251 is formed a cavity forming surface 255B forming a cavity 256 for molding the frame unit 4A in cooperation with a cavity forming surface 255A of the stationary metal mold 251. The movable metal mold 252 is provided with plural ejection pins 257 adapted for being protruded into the cavity 256 by the driving unit, not shown.

These ejection pins 257 traverse the guide holes 258 formed in the movable metal mold 252 so that the distal ends 257A thereof face the cavity 256 flush with the cavity forming surface 252B. These ejection pins 257 are protruded into the cavity 256 by the driving unit in the mold opening state in which the movable metal mold is spaced apart from the stationary metal mold 251, as will be explained subsequently.

Figure 28:
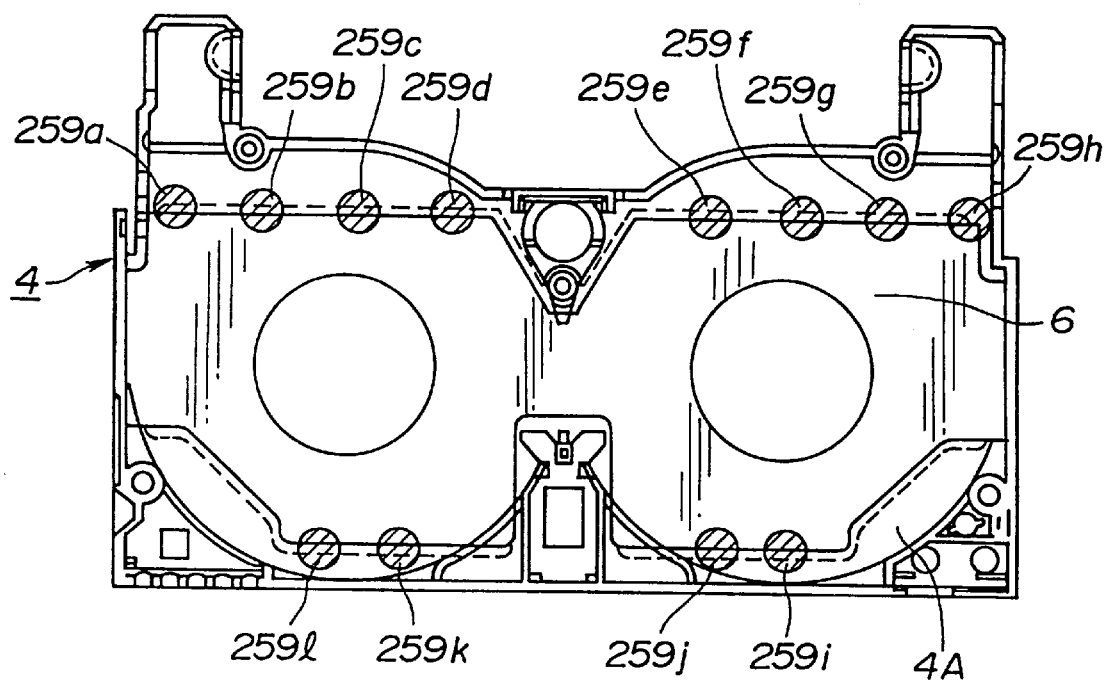
FIG. 28 is a plan view of a lower cassette half showing the protruded position of an ejection pin provided on a movable metal mold of the metal mold device.

The ejection pins 257 are arranged within the movable metal mold 252 along connecting portions 259a to 259l between the metal plate 6 and the frame unit 4A including the corners of the metallic plate 6 where stress concentration occurs, as shown in FIG. 28. The distal ends 257A of the ejection pins 257 are sized to lie astride the frame unit 4A and the metallic plate 6, as shown in FIGS. 26 and 27. Each ejection pin 257 is arranged within the movable metal mold 252 so that centerline L thereof will be aligned with the junction between the frame unit 4A and the metallic plate 6, as shown in FIGS. 26 and 27. Thus, when ejecting the lower cassette half 4, the ejection pins 257 impinge equally on the frame unit 4A and on the metallic plate 6.

With the above-described metal mold device 250 for molding the cassette half, the metallic plate 6 is loaded in position by having the holding protrusion 253 of the stationary metal mold 251 in the mold opening state of the movable metal mold 252 fitted into the reel bearing hole 41 of the metal plate 6. The holding force adjustment portion 254 on the distal end of the holding protrusion 253 operates for adjusting the holding force for the metallic plate 6. Such holding force positively holds the metallic plate 6 in the stationary metal mold 251 while allowing the metallic plate 6 to be detached easily from the stationary metal mold 251 during metal mold opening as later explained.

With the metal mold device 250, the movable metal mold 252 is approached to the stationary metal mold 251 for mold clamping for defining the cavity 256 for forming the lower cassette half 4 between the stationary metal mold 251 and the movable metal mold 252. The synthetic resin material in the molten state is injected and charged via a gate, not shown, into the cavity 256, as described above, for insertion-molding the metallic plate 6 on the frame unit 4A of synthetic resin for molding the lower cassette half 4.

After lapse of a pre-set cooling time, the synthetic resin material charged into the cavity 256 of the metal mold device 250 is cured to form the lower cassette half 4. The movable metal mold 252 is then moved away from the stationary metal mold 251 by way of performing the mold opening operation. At this time, the molded lower cassette half 4 is affixed to the movable metal mold 252. The movable metal mold 252b is provided with plural ejection pins 257, as described previously. These ejection pins 257 eject the lower cassette half 4 for releasing from the movable metal mold 252.

Meanwhile, since the lower cassette half 4 is constituted by the frame unit 4A and the metallic plate 6 having significantly different values of the thermal contraction coefficients. Thus, during the insertion molding, the lower cassette half is cured during insertion molding under such a condition in which the frame unit 4A is attached to the cavity forming surface 255B of the movable metal mold 252. The metallic plate 6 is held by the holding protrusion 253. Therefore, the frame unit 4A and the metallic plate 6 of the lower cassette half exhibit differential mold release resistance with respect to the stationary metal mold 251.

Since the holding force adjustment means 254 is formed at the distal end of the holding protrusion 253 holding the metallic plate 6 as described above, the holding force of the metallic plate 6 remains adjusted, so that, with the metal mold device 250, the metal plate 6 may be easily detached from the holding protrusion 253 at the time of mold opening so as to be attached to the movable metal mold 252. This suppresses stress concentration at the respective corners of the metallic plate 6 of the lower cassette half 4 for preventing whiting or cracking in these corners of the metallic plate 6.

In addition, in the metal mold device 250, the mold release resistance is produced between the frame unit 4A and the metallic plate 6 nipping the cavity forming surface 252B during mole releasing. That is, in the lower cassette half 4, the center points of the ejection pins 257 are positioned on the junction portions 259a to 259l, inclusive of corners, between the lower cassette half 4A and the metallic plate 6, for impinging equally on the two members, as shown in FIG. 28. Thus the two members are ejected with an equal force despite the difference in the mold release resistance between the frame unit 4A and the metal plate 6. In addition, the ejection pins 257 eject the corners of the frame unit 4 and the metallic plate 6 where stress concentration tends to occur by the above-mentioned difference in the mold release pressure. Thus the lower cassette half 4 may be easily released in an optimum state by the ejection pin 257 without producing whiting or cracking at the junction portions between the frame unit 4A and the metallic plate 6.

Meanwhile, the ejection pin 257 has the gas discharging function during molding. That is, there is formed a tiny gap between the ejection pin 257 and the guide hole 258 provided in the movable metal mold 252 designed for slidably guiding the ejection pin 257. The gas evolved during molding may be discharged via this gap to outside of the metal mold during molding.

The gap formed between the guide hole 258 and the ejection pin 257 is as small as 1/1000 mm and hence does not permit leakage of the synthetic resin used for molding, although it allows passage of the gas as described above.

Since the gas during molding can be discharged via the gap generated in view of allowing the sliding of the ejection pin 257, the synthetic resin can be smoothly charged into the through-hole 81 provided for allowing the synthetic resin to be charged on the insertion allowance 46 of the metallic plate 6, thus positively preventing molding troubles.

Thus, with the use of the metal mold device of the present invention, sufficient bonding strength may be maintained between the frame unit 4A and the metal plate 4 thus enabling the sturdy lower cassette half 4 to be produced by molding.

The present invention is not limited to the above-mentioned tape cassette, but may also be applied to a tape cassette designed for housing a tape-shaped recording medium. In addition, the present invention may be applied to a tape cassette for cleaning having a common cassette main body unit and housing therein a cleaning tape in place of the tape-shaped recording medium. Furthermore, the present invention may be applied to a tape cassette for audio equipment or a tape cassette for a recording medium used for a computer or the like equipment without being limited to the tape cassette for a video tape recorder.

What is claimed is:

1. A metal mold for molding a cassette half comprised of a frame unit of synthetic resin and a metallic plate insertion-molded on said frame unit, said frame unit constituting a main cassette body portion within which are rotatably accommodated a pair of tape reels on which a tape-shaped recording medium is wound, comprising:

a first mold half having a first cavity for molding said cassette half, said metallic plate being loaded in position in said first cavity;

said metal mold having essentially two states, open and closed; and a second mold half arranged facing said first mold half so as to be brought into and out of contact with said first mold half by a driving means, said second mold half having a second cavity for defining a cavity space while said metal mold is in closed state in cooperation with said first cavity and an ejection pin for ejecting the cassette half out of said second mold half in said cavity space during a transition of said metal mold from closed to open:

said ejection pin abutting against both the frame unit and the metallic plate for ejecting the cassette half in said cavity space out of said second mold half.

2. The metal mold as claimed in claim 1 wherein the ejection pin is located so that its centerline is positioned at a junction line between the frame unit and the metallic plate.

3. The metal mold as claimed in claim 1 wherein a plurality of said ejection pins are provided and at least two of the ejection pins are abutted against both the frame unit and the metallic plate astride said frame unit and the metallic plate.

4. The metal mold as claimed in claim 3 wherein the ejection pins arranged in register with the corners of said metallic plate are abutted against both the frame unit and the metallic plate astride said frame unit and the metallic plate.

5. A metal mold for molding a cassette half comprising a frame unit of synthetic resin and a metallic plate insertion-molded on said frame unit, said frame unit constituting a main cassette body portion within which are rotatably accommodated a pair of tape reels on which a tape-shaped recording medium is wound, an ejection pin for taking out the cassette half, a through-hole formed in said metallic plate for at least partially facing an insertion allowance on said metallic plate, said ejector pin operating through said through-hole, said through-hole being charged with synthetic resin constituting the frame unit.

6. The metal mold as claimed in claim 5 wherein said ejection pin also has the function of discharging gas evolved during molding.

* * * * *